US011568035B2

(12) United States Patent
Spizhevoy et al.

(10) Patent No.: US 11,568,035 B2
(45) Date of Patent: *Jan. 31, 2023

(54) DEEP NEURAL NETWORK FOR IRIS IDENTIFICATION

(71) Applicant: Magic Leap, Inc., Plantation, FL (US)

(72) Inventors: Alexey Spizhevoy, Nizhny Novgorod (RU); Adrian Kaehler, Los Angeles, CA (US); Gary Bradski, Palo Alto, CA (US)

(73) Assignee: Magic Leap, Inc., Plantation, FL (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/129,711

(22) Filed: Dec. 21, 2020

(65) Prior Publication Data

US 2021/0110020 A1    Apr. 15, 2021

Related U.S. Application Data

(63) Continuation of application No. 15/497,927, filed on Apr. 26, 2017, now Pat. No. 10,922,393.

(30) Foreign Application Priority Data

Jul. 14, 2016   (RU) .......................... RU2016128792

(51) Int. Cl.
G06F 21/32       (2013.01)
G06N 3/04        (2006.01)
(Continued)

(52) U.S. Cl.
CPC ............. *G06F 21/32* (2013.01); *G06N 3/04* (2013.01); *G06N 3/0454* (2013.01); *G06N 3/08* (2013.01);
(Continued)

(58) Field of Classification Search
USPC .......................................... 382/117, 156, 190
See application file for complete search history.

(56) References Cited

U.S. PATENT DOCUMENTS 5,291,560 A    3/1994   Daugman
5,583,795 A   12/1996   Smyth
(Continued)

FOREIGN PATENT DOCUMENTS

WO   WO 2014/182769   11/2014
WO   WO 2015/164807   10/2015
(Continued)

OTHER PUBLICATIONS

European Extended Search Report for EP Application No. 17828103.6, dated Jan. 17, 2020.
(Continued)

Primary Examiner — Kathleen Y Dulaney
(74) Attorney, Agent, or Firm — Knobbe, Martens, Olson & Bear, LLP

(57) ABSTRACT

Systems and methods for iris authentication are disclosed. In one aspect, a deep neural network (DNN) with a triplet network architecture can be trained to learn an embedding (e.g., another DNN) that maps from the higher dimensional eye image space to a lower dimensional embedding space. The DNN can be trained with segmented iris images or images of the periocular region of the eye (including the eye and portions around the eye such as eyelids, eyebrows, eyelashes, and skin surrounding the eye). With the triplet network architecture, an embedding space representation (ESR) of a person's eye image can be closer to the ESRs of the person's other eye images than it is to the ESR of another person's eye image. In another aspect, to authenticate a user
(Continued)

as an authorized user, an ESR of the user's eye image can be sufficiently close to an ESR of the authorized user's eye image.

13 Claims, 9 Drawing Sheets

(51) Int. Cl.
*G06V 40/19* (2022.01)
*G06V 40/18* (2022.01)
*G06N 3/08* (2006.01)
*G06N 7/00* (2006.01)

(52) U.S. Cl.
CPC ............. *G06N 7/005* (2013.01); *G06V 40/19* (2022.01); *G06V 40/197* (2022.01)

(56) References Cited

U.S. PATENT DOCUMENTS

| | | | |
|---|---|---|---|
| 6,850,221 B1 | 2/2005 | Tickle | |
| D514,570 S | 2/2006 | Ohta | |
| 7,771,049 B2 | 8/2010 | Knaan et al. | |
| 7,970,179 B2 | 6/2011 | Tosa | |
| 8,077,914 B1 | 12/2011 | Kaplan | |
| 8,098,891 B2 | 1/2012 | Lv et al. | |
| 8,165,406 B2 | 4/2012 | Tan et al. | |
| 8,341,100 B2 | 12/2012 | Miller et al. | |
| 8,345,984 B2 | 1/2013 | Ji et al. | |
| 8,363,783 B2 | 1/2013 | Gertner et al. | |
| 8,845,625 B2 | 9/2014 | Angeley et al. | |
| 8,950,867 B2 | 2/2015 | Macnamara | |
| 9,081,426 B2 | 7/2015 | Armstrong | |
| 9,141,916 B1 | 9/2015 | Corrado et al. | |
| 9,215,293 B2 | 12/2015 | Miller | |
| 9,262,680 B2 | 2/2016 | Nakazawa et al. | |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,430,829 B2 | 8/2016 | Madabhushi et al. | |
| 9,470,906 B2 | 10/2016 | Kaji et al. | |
| 9,514,405 B2 | 12/2016 | Chen et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,592,732 B1 | 3/2020 | Sather et al. | |
| 10,922,393 B2 | 2/2021 | Spizhevoy et al. | |
| 2004/0130680 A1 | 7/2004 | Zhou et al. | |
| 2006/0028436 A1 | 2/2006 | Armstrong | |
| 2006/0036596 A1 | 2/2006 | Zhang et al. | |
| 2006/0088193 A1 | 4/2006 | Muller et al. | |
| 2006/0147094 A1 | 7/2006 | Yoo | |
| 2006/0228005 A1 | 10/2006 | Matsugu et al. | |
| 2007/0052672 A1 | 3/2007 | Ritter et al. | |
| 2007/0081123 A1 | 4/2007 | Lewis | |
| 2007/0140531 A1 | 6/2007 | Hamza | |
| 2007/0189742 A1 | 8/2007 | Knaan et al. | |
| 2008/0310687 A1 | 12/2008 | Hua et al. | |
| 2009/0129591 A1 | 5/2009 | Hayes et al. | |
| 2009/0141947 A1 | 6/2009 | Kyyko et al. | |
| 2009/0163898 A1 | 6/2009 | Gertner et al. | |
| 2009/0232365 A1 | 9/2009 | Berthilsson et al. | |
| 2010/0014718 A1 | 1/2010 | Sawides et al. | |
| 2010/0131096 A1 | 5/2010 | Koyano | |
| 2010/0208951 A1 | 8/2010 | Williams et al. | |
| 2010/0220906 A1* | 9/2010 | Abramoff | G06V 30/194 382/165 |
| 2010/0232654 A1 | 9/2010 | Rahmes et al. | |
| 2010/0284576 A1 | 11/2010 | Tosa et al. | |
| 2011/0182469 A1 | 7/2011 | Ji et al. | |
| 2011/0202046 A1 | 8/2011 | Angeley et al. | |
| 2012/0127062 A1 | 5/2012 | Bar-Zeev et al. | |
| 2012/0162549 A1 | 6/2012 | Gao et al. | |
| 2012/0163678 A1 | 6/2012 | Du et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0126782 A1 | 5/2014 | Takai et al. | |
| 2014/0161325 A1 | 6/2014 | Bergen | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0270405 A1 | 9/2014 | Derakhshani et al. | |
| 2014/0279774 A1 | 9/2014 | Wang et al. | |
| 2014/0306866 A1 | 10/2014 | Miller et al. | |
| 2014/0341441 A1 | 11/2014 | Slaby et al. | |
| 2014/0380249 A1 | 12/2014 | Fleizach | |
| 2015/0016777 A1 | 1/2015 | Abovitz et al. | |
| 2015/0103306 A1 | 4/2015 | Kaji et al. | |
| 2015/0117760 A1 | 4/2015 | Wang et al. | |
| 2015/0125049 A1 | 5/2015 | Taigman et al. | |
| 2015/0134583 A1 | 5/2015 | Tamatsu et al. | |
| 2015/0154758 A1 | 6/2015 | Nakazawa et al. | |
| 2015/0170002 A1 | 6/2015 | Szegedy et al. | |
| 2015/0178939 A1 | 6/2015 | Bradski et al. | |
| 2015/0205126 A1 | 7/2015 | Schowengerdt | |
| 2015/0205995 A1* | 7/2015 | Yamada | G06V 40/50 382/118 |
| 2015/0205998 A1 | 7/2015 | Suh et al. | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0278642 A1 | 10/2015 | Chertok et al. | |
| 2015/0302652 A1 | 10/2015 | Miller et al. | |
| 2015/0309263 A2 | 10/2015 | Abovitz et al. | |
| 2015/0326570 A1* | 11/2015 | Publicover | G06F 3/04817 382/117 |
| 2015/0338915 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0012292 A1 | 1/2016 | Perna et al. | |
| 2016/0012304 A1 | 1/2016 | Mayle et al. | |
| 2016/0026253 A1 | 1/2016 | Bradski et al. | |
| 2016/0034679 A1 | 2/2016 | Yun et al. | |
| 2016/0034811 A1 | 2/2016 | Paulik et al. | |
| 2016/0035078 A1 | 2/2016 | Lin et al. | |
| 2016/0078359 A1 | 3/2016 | Csurka et al. | |
| 2016/0098844 A1 | 4/2016 | Shaji et al. | |
| 2016/0104053 A1 | 4/2016 | Yin et al. | |
| 2016/0104056 A1 | 4/2016 | He et al. | |
| 2016/0135675 A1 | 5/2016 | Du et al. | |
| 2016/0162782 A1 | 6/2016 | Park | |
| 2016/0171280 A1* | 6/2016 | Han | G06V 40/1347 348/77 |
| 2016/0180151 A1 | 6/2016 | Philbin et al. | |
| 2016/0232408 A1* | 8/2016 | Lee | G06F 3/048 |
| 2016/0291327 A1 | 10/2016 | Kim et al. | |
| 2016/0299685 A1 | 10/2016 | Zhai et al. | |
| 2016/0364609 A1 | 12/2016 | Ivanisov et al. | |
| 2017/0053165 A1 | 2/2017 | Kaehler | |
| 2017/0132250 A1 | 5/2017 | Merler et al. | |
| 2017/0161506 A1 | 6/2017 | Gates et al. | |
| 2017/0168566 A1 | 6/2017 | Osterhout et al. | |
| 2017/0186236 A1 | 6/2017 | Kawamoto | |
| 2017/0228641 A1* | 8/2017 | Sohn | G06N 3/04 |
| 2017/0308734 A1 | 10/2017 | Chalom et al. | |
| 2018/0018451 A1 | 1/2018 | Spizhevoy et al. | |
| 2018/0018515 A1* | 1/2018 | Spizhevoy | G06V 40/197 |
| 2018/0089834 A1 | 3/2018 | Spizhevoy et al. | |
| 2018/0096226 A1 | 4/2018 | Aliabadi et al. | |

(56) References Cited

U.S. PATENT DOCUMENTS

| | | | |
|---|---|---|---|
| 2018/0137642 | A1 | 5/2018 | Malisiewicz et al. |
| 2018/0285738 | A1 | 10/2018 | Bouton |
| 2019/0080204 | A1 | 3/2019 | Schroff et al. |

FOREIGN PATENT DOCUMENTS

| | | |
|---|---|---|
| WO | WO 2016/018488 | 2/2016 |
| WO | WO 2018/013199 | 1/2018 |
| WO | WO 2018/013200 | 1/2018 |
| WO | WO 2018/039269 | 3/2018 |
| WO | WO 2018/063451 | 4/2018 |
| WO | WO 2018/067603 | 4/2018 |
| WO | WO 2018/093796 | 5/2018 |

OTHER PUBLICATIONS

International Search Report and Written Opinion for PCT Application No. PCT/US15/29679, dated Jul. 6, 2017.
Invitation to Pay Additional Fees And, Where Applicable, Protest Fee for PCT Application No. PCT/US17/29699, dated Jul. 10, 2017.
International Search Report and Written Opinion for PCT Application No. PCT/US17/29699, dated Sep. 8, 2017.
International Preliminary Report on Patentability for PCT Application No. PCT/US17/29699, dated Jan. 15, 2019.
International Search Report and Written Opinion for PCT Application No. PCT/US2017/034482, dated Aug. 2, 2017.
International Search Report and Written Opinion for PCT Application No. PCT/US2017/054987, dated Dec. 12, 2017.
International Search Report and Written Opinion for PCT Application No. PCT/US2017/48068, dated Nov. 20, 2017.
International Search Report and Written Opinion for PCT Application No. PCT/US2017/061618, dated Jan. 17, 2018.
"Camera calibration with OpenCV", OpenCV, retrieved May 5, 2016, in 7 pages. URL: http://docs.opencv.org/3.1.0/d4/d94/tutorial_camera_calibration.html#gsc.tab=0.
"Feature Extraction Using Convolution", Ufldl, printed Sep. 1, 2016, in 3 pages. URL:http://deeplearning.stanford.edu/wiki/index.php/Feature_extraction_using_convolution.
"Machine Learning", Wikipedia, printed Oct. 3, 2017, in 14 pages. URL: https://en.wikipedia.org/wiki/Machine_learning.
"Transfer Function Layers", GitHub, Dec. 1, 2015, in 13 pages; accessed URL: http://github.com/torch/nn/blob/master/doc/transfer.md.
Adegoke et al., "Iris Segmentation: A Survey", Int J Mod Engineer Res. (IJMER) (Jul./Aug. 2013) 3(4): 1885-1889.
Anthony, S., "MIT releases open-source software that reveals invisible motion and detail in video", Extreme Tech, Feb. 28, 2013, as accessed Aug. 4, 2017, in 5 pages.
Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.
ARToolKit: https://web.archive.org/web/20051013062315/http://www.hitl.washington.edu:80/artoolkit/documentation/hardware.htm, archived Oct. 13, 2005.
Aubry M. et al., "Seeing 3D chairs: exemplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Badrinarayanan et al., "SegNet: A Deep Convolutional Encoder-Decoder Architecture for Image Segmentation", IEEE (Dec. 8, 2015) arXiv:1511.00561v2 in 14 pages.
Badrinarayanan et al., "SegNet: A Deep Convolutional Encoder-Decoder Architecture for Image Segmentation", TPAMI, vol. 39, No. 12, Dec. 2017.
Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.
Belagiannis V. et al., "Recurrent Human Pose Estimation", In Automatic Face & Gesture Recognition; 12th IEEE International Conference—May 2017, ar Xiv:1605.02914v3; (Aug. 5, 2017) Open Access Version in 8 pages.
Bell S. et al., "Inside-Outside Net: Detecting Objects in Context with Skip Pooling and Recurrent Neural Networks", in Proceedings of the IEEE Conference on Computer Vision and Pattern Recognition, Jun. 27-30, 2016; pp. 2874-2883.
Biederman I., "Recognition-by-Components: A Theory of Human Image Understanding", Psychol Rev. (Apr. 1987) 94(2): 115-147.
Bimber, et al., "Spatial Augmented Reality—Merging Real and Virtual Worlds," 2005 https://web.media.mit.edu/~raskar/book/BimberRaskarAugmentedRealityBook.pdf.
Bouget, J., "Camera Calibration Toolbo for Matlab" Cal-Tech, Dec. 2, 2013, in 5 pages. URL: https://www.vision.caltech.edu/bouguetj/calib_doc/inde .html#parameters.
Bulat A. et al., "Human pose estimation via Convolutional Part Heatmap Regression", arXiv e-print arXiv:1609.01743v1, Sep. 6, 2016 in 16 pages.
Carreira J. et al., "Human Pose Estimation with Iterative Error Feedback", In Proceedings of the IEEE Conference on Computer Vision and Pattern Recognition, Jun. 27-30, 2016, pp. 4733-4742.
Chatfield et al., "Return of the Devil in the Details: Delving Deep into Convolutional Nets", arXiv e-print arXiv:1405.3531v4, Nov. 5, 2014 in 11 pages.
Chen et al., "Semantic image Segmentation With Deep Convolutional Nets and Fully Connected CRFs," In ICLR, arXiv:1412.7062v3 [cs.CV] Apr. 9, 2015.
Chen X. et al., "3D Object Proposals for Accurate Object Class Detection", in Advances in Neural Information Processing Systems, (2015) Retrieved from <http://papers.nips.cc/paper/5644-3d-objectproposals-for-accurate-object-class-detection.pdf>; 11 pages.
Choy et al., "3D-R2N2: A Unified Approach for Single and Multi-view 3D Object Reconstruction", arXiv; e-print arXiv:1604.00449v1, Apr. 2, 2016 in 17 pages.
Collet et al., "The MOPED framework: Object Recognition and Pose Estimation for Manipulation", The International Journal of Robotics Research. (Sep. 2011) 30(10):1284-306; preprint Apr. 11, 2011 in 22 pages.
Coughlan et al., "The Manhattan World Assumption: Regularities in scene statistics which enable bayesian inference," In NIPS, 2000.
Crivellaro A. et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).
Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).
Dai J. et al., "R-FCN: Object Detection via Region-based Fully Convolutional Networks", in Advances in neural information processing systems; (Jun. 21, 2016) Retrieved from <https://arxiv.org/pdf/1605.06409.pdf in 11 pages.
Dasgupta et al., "Delay: Robust Spatial Layout Estimation for Cluttered Indoor Scenes," In CVPR, 2016.
Daugman, J. et al., "Epigenetic randomness, compleity and singularity of human iris patterns", Proceedings of Royal Society: Biological Sciences, vol. 268, Aug. 22, 2001, in 4 pages.
Daugman, J., "New Methods in Iris Recognition," IEEE Transactions on Systems, Man, and Cybernetics—Part B: Cybernetics, vol. 37, No. 5, Oct. 2007, in 9 pages.

(56) References Cited

OTHER PUBLICATIONS

Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.
Del Pero et al., "Bayesian geometric modeling of indoor scenes," In CVPR, 2012.
Del Pero et al., "Understanding bayesian rooms using composite 3d object models," In CVPR, 2013.
Detone D. et al., "Deep Image Homography Estimation", arXiv e-print arXiv:1606.03798v1, Jun. 13, 2016 in 6 pages.
Dwibedi et al., "Deep Cuboid Detection: Beyond 2D Bounding Boes", arXiv e-print arXiv:1611.10010v1; Nov. 30, 2016 in 11 pages.
Everingham M. et al., "The PASCAL Visual Object Classes (VOC) Challenge", Int J Comput Vis (Jun. 2010) 88(2):303-38.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
Fidler S. et al., "3D Object Detection and Viewpoint Estimation with a Deformable 3D Cuboid Model", in *Proceedings of the 25th International Conference on Neural Information Processing Systems*, (Dec. 3-6, 2012), pp. 611-619.
Fouhey D. et al., "Data-Driven 3D Primitives for Single Image Understanding", Proceedings of the IEEE International Conference on Computer Vision, Dec. 1-8, 2013; pp. 3392-3399.
Geiger A. et al., "Joint 3D Estimation of Objects and Scene Layout", In Advances in Neural Information Processing Systems 24; (Dec. 12-17, 2011) in 9 pages.
Gidaris S. et al., "Object detection via a multi-region & semantic segmentation-aware CNN model", in Proceedings of the IEEE international Conference on Computer Vision; Dec. 7-13, 2015 (pp. 1134-1142).
Girshick R. et al., "Fast R-CNN", Proceedings of the IEEE International Conference on Computer Vision; Dec. 7-13, 2015 (pp. 1440-1448).
Girshick R et al., "Rich feature hierarchies for accurate object detection and semantic segmentation", Proceedings of the IEEE Conference on Computer Vision and Pattern Recognition, Jun. 23-28, 2014 (pp. 580-587).
Gupta A. et al., "Blocks World Revisited: Image Understanding Using Qualitative Geometry and Mechanics", in European Conference on Computer Vision; Sep. 5, 2010 in 14 pages.
Gupta A. et al., "From 3D Scene Geometry to Human Workspace", in Computer Vision and Pattern Recognition (CVPR); IEEE Conference on Jun. 20-25, 2011 (pp. 1961-1968).
Gupta et al., "Perceptual Organization and Recognition of Indoor Scenes from RGB-D Images," In CVPR, 2013.
Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).
Gupta S. et al., "Inferring 3D Object Pose in RGB-D Images", arXiv e-print arXiv:1502.04652v1, Feb. 16, 2015 in 13 pages.
Gupta S. et al., "Learning Rich Features from RGB-D Images for Object Detection and Segmentation", in European Conference on Computer Vision; (Jul. 22, 2014); Retrieved from <https://arxiv.org/pdf/1407.5736.pdf> in 16 pages.
Han et al., "Deep Compression: Compressing Deep Neural Networks with Pruning, Trained Quantization and Huffman Coding", arXiv e-print arX iv:1510.00149v5, Feb. 15, 2016 in 14 pages.
Hansen, D. et al., "In the Eye of the Beholder: A Survey of Models for Eyes and Gaze", IEEE Transactions on Pattern Analysis and Machine Intelligence, vol. 32, No. 3, Mar. 2010, in 23 pages.
Hartley R. et al., *Multiple View Geometry in Computer Vision*, 2nd Edition; Cambridge University Press, (Apr. 2004); in 673 pages.
He et al., "Deep Residual Learning for Image Recognition," In CVPR, 2016.
He et al., "Delving Deep into Rectifiers: Surpassing Human-level Performance on ImageNet Classification", arXiv: e-print arXiv:1502.01852v1, Feb. 6, 2015.
He et al., "Spatial Pyramid Pooling in Deep Convolutional Networks for Visual Recognition", arXiv e-print arXiv:1406.4729v2; Aug. 29, 2014 in 14 pages.
Hedau et al., "Recovering the Spatial Layout of Cluttered Rooms," In ICCV, 2009.
Hedau V. et al., "Recovering Free Space of Indoor Scenes from a Single image", in *Computer Vision and Pattern Recognition* (CVPR), IEEE Conference Jun. 16-21, 2012 (pp. 2807-2814).
Hejrati et al., "Categorizing Cubes: Revisiting Pose Normalization", Applications of Computer Vision (WACV), 2016 IEEE Winter Conference, Mar. 7-10, 2016 in 9 pages.
Hijazi, S. et al., "Using Convolutional Neural Networks for Image Recognition", Tech Rep. (Sep. 2015) available online URL: http://ip.cadence.com/uploads/901/cnn-wp-pdf, in 12 pages.
Hochreiter et al., "Long Short-Term Memory," Neural computation, 9, 1735-1780, 1997.
Hoffer et al., "Deep Metric Learning Using Triplet Network", International Workshop on Similarity-Based Pattern Recognition [ICLR]; Nov. 25, 2015; [online] retrieved from the internet <https://arxv.org/abs/1412.6622>; pp. 84-92.
Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 pages.
Hsiao E. et al., "Making specific features less discriminative to improve point-based 3D object recognition", in *Computer Vision and Pattern Recognition* (CVPR), IEEE Conference, Jun. 13-18, 2010 (pp. 2653-2660).
Huang et al., "Sign Language Recognition Using 3D Convolutional Neural Networks", University of Science and Technology of China, 2015 IEEE International Conference on Multimedia and Expo. Jun. 29-Jul. 3, 2015, in 6 pages.
Iandola F. et al., "SqueezeNet: Ale Net-level accuracy with 50 fewer parameters and <1MB model size", arXiv e-print arXiv:1602.07360v1, Feb. 24, 2016 in 5 pages.
Ioffe S. et al., "Batch Normalization: Accelerating Deep Network Training by Reducing Internal Covariate Shift", International Conference on Machine Learning (Jun. 2015); pp. 448-456.
Izadinia et al., "IM2CAD," arXiv preprint arXiv:1608.05137, 2016.
Jacob, "Eye Tracking in Advanced Interface Design," Human-Computer Interaction Lab Naval Research Laboratory, Washington, D.C. / paper/ in Virtual Environments and Advanced interface Design, ed. by W. Barfield and T.A. Furness, pp. 258-288, Oxford University Press, New York (1995).
Jarrett et al., "What is the Best Multi-Stage Architecture for Object Recognition?," In Computer Vision IEEE 12th International Conference Sep. 29-Oct. 2, 2009, pp. 2146-2153.
Ji, H. et al., "3D Convolutional Neural Networks for Human Action Recognition", IEEE Transactions on Pattern Analysis and Machine Intelligence, vol. 35:1, Jan. 2013, in 11 pages.
Jia et al., "3D-Based Reasoning with Blocks, Support, and Stability", Proceedings of the IEEE Conference on Computer Vision and Pattern Recognition; Jun. 23-28, 2013 in 8 pages.
Jia et al., "Caffe: Convolutional Architecture for Fast Feature Embedding", arXiv e-print arXiv:1408.5093v1, Jun. 20, 2014 in 4 pages.
Jiang H. et al., "A Linear Approach to Matching Cuboids in RGBD Images", in *Proceedings of the IEEE Conference on Computer Vision and Pattern Recognition*. Jun. 23-28, 2013 (pp. 2171-2178).
Jillela et al., "An Evaluation of Iris Segmentation Algorithms in Challenging Periocular Images", Handbook of Iris Recognition, Springer Verlag, Heidelberg (Jan. 12, 2013) in 28 pages.
Kar A. et al., "Category-specific object reconstruction from a single image", in *Proceedings of the IEEE Conference on Computer Vision and Pattern Recognition*. Jun. 7-12, 2015 (pp. 1966-1974).
Krizhevsky et al., "ImageNet Classification with Deep Convolutional Neural Networks", Advances in Neural Information Processing Systems. Apr. 25, 2013, pp. 1097-1105.
Lavin, A. et al.: "Fast Algorithms for Convolutional Neural Networks", Proceedings of the IEEE Conference on Computer Vision and Pattern Recognition (Nov. 2016) arXiv:1509.09308v2, Nov. 10, 2015 in 9 pages.

(56) References Cited

OTHER PUBLICATIONS

Le, et al., Smooth Skinning Decomposition with Rigid Bones, ACM Transactions on Graphics (TOG). vol. 31(6), pp. 199-209, Nov. 2012.
Lee D. et al., "Geometric Reasoning for Single Image Structure Recovery", in IEEE Conference Proceedings in Computer Vision and Pattern Recognition (CVPR) Jun. 20-25, 2009, pp. 2136-2143.
Lee et al., "Deeply-Supervised Nets," in AISTATS, San Diego, CA 2015, JMLR: W&CP vol. 38.
Lee et al., "Estimating Spatial Layout of Rooms using Volumetric Reasoning about Objects and Surfaces," In NIPS, 2010.
Lee et al., "Generalizing Pooling Functions in Convolutional Neural Networks: Mixed, Gated, and Tree," In AISTATS, Gadiz, Spain, JMLR: W&CP vol. 51, 2016.
Lee et al., "Recursive Recurrent Nets with Attention Modeling for OCR in the Wild," In CVPR, 2016.
Liang et al., "Recurrent Convolutional Neural Network for Object Recognition," In CVPR, 2015.
Lim J. et al., "FPM: Fine pose Parts-based Model with 3D CAD models", European Conference on Computer Vision; Springer Publishing, Sep. 6, 2014, pp. 478-493.
Liu et al., "ParseNet: Looking Wider to See Better", arXiv e-print arXiv:1506.04579v1; Jun. 15, 2015 in 9 pages.
Liu et al., "Rent3d: Floor-Plan Priors for Monocular Layout Estimation," In CVPR, 2015.
Liu W. et al., "SSD: Single Shot MultiBo Detector", arXiv e-print arXiv:1512.02325v5, Dec. 29, 2016 in 17 pages.
Long et al., "Fully Convolutional Networks for Semantic Segmentation", Proceedings of the IEEE Conference on Computer Vision and Pattern Recognition (Jun. 7-12, 2015) in 10 pages.
Mallya et al., "Learning Informative Edge Maps for Indoor Scene Layout Prediction," In ICCV, 2015.
Mirowski et al., "Learning to Navigate in Complex Environments," In ICLR, 2017.
Nair et al., "Rectified Linear Units Improve Restricted Boltzmann Machines," In ICML, Haifa, Israel Jun. 2010.
Newell et al., "Stacked Hourglass Networks for Human Pose Estimation," In ECCV, ArXiv:1603.06937v2 [cs.CV] 2016.
Noh et al., "Learning Deconvolution Network for Semantic Segmentation," In ICCV, 2015.
Oberweger et al., "Training a Feedback Loop for Hand Pose Estimation," In ICCV, 2015.
Open CV: "Camera calibration with OpenCV", OpenCV, retrieved May 5, 2016, in 12 pages. URL: http://docs.opencv.org/2.4/doc/tutorials/calib3d/camera_calibration/camera_calibration.html.
OpenCV: "Camera Calibration and 3D Reconstruction", OpenCV, retrieved May 5, 2016, in 51 pages. URL: http://docs.opencv.org/2.4/modules/calib3d/doc/camera_calibration_and_3d_reconstruction.html.
Pavlakos G. et al., "6-dof object pose from semantic keypoints", in arXiv preprint Mar. 14, 2017; Retrieved from <http://www.cis.upenn.edu/~kostas/mypub.dir/pavlakos17icra.pdf> in 9 pages.
Peng et al., "A Recurrent Encoder-Decoder Network for Sequential Face Alignment," In ECCV, arXiv:1608.054772 [cs.CV] 2016.
Pfister et al., "Flowing Convnets for Human Pose Estimation in Videos," In ICCV, 2015.
Ramalingam et al., "Manhattan Junction Catalogue for Spatial Reasoning of Indoor Scenes," In CVPR, 2013.
Rastegari et al., "XNOR-Net: ImageNet Classification Using Binary Convolutional Neural Networks", arXiv e-print arXiv:1603.05279v4; Aug. 2, 2016 in 17 pages.
Redmon et al., "You Only Look Once: Unified, Real-Time Object Detection", Proceedings of the IEEE Conference on Computer Vision and Pattern Recognition (Jun. 27-30, 2016) pp. 779-788.
Ren et al., "A Coarse-to-Fine Indoor Layout Estimation (CFILE) Method," In ACCV, arXiv:1607.005981 [cs.CV] 2016.
Ren et al., "Faster R-CNN: Towards real-time object detection with region proposal networks", arxiv e-print arXiv:1506.01497v3; Jan. 6, 2016 in 14 pages.
Ren et al.: "On Vectorization of Deep Convolutional Neural Networks for Vision Tasks," AAAI, arXiv: e-print arXiv:1501.07338v1, Jan. 29, 2015 in 8 pages.
Roberts L. et al., "Machine Perception of Three-Dimensional Solids", Doctoral Thesis MIT; Jun. 1963 in 82 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtube.
Russell et al., "Labelme: a database and web-based tool for image annotation," IJCV, vol. 77, Issue 1-3, pp. 157-173, May 2008.
Savarese et al., "3D generic object categorization, localization and pose estimation", in *Computer Vision*, IEEE 11th International Conference; Oct. 14-21, 2007, in 8 pages.
Saxena A., "Convolutional Neural Networks (CNNS): An Illustrated E planation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv eprint arXiv:1503.03832v3, Jun. 17, 2015 in 10 pages.
Schwing et al., "Efficient Structured Prediction for 3D Indoor Scene Understanding," In CVPR, 2012.
Shafiee et al., "ISAAC: A Convolutional Neural Network Accelerator with In-Situ Analog Arithmetic in Crossbars", ACM Sigarch Comp. Architect News (Jun. 2016) 44(3):14-26.
Shao et al., "Imagining the Unseen: Stability-based Cuboid Arrangements for Scene Understanding", ACM Transactions on Graphics. (Nov. 2014) 33(6) in 11 pages.
Shi et al., "Convolutional LSTM Network: A Machine Learning Approach for Precipitation Nowcasting," in NIPS, 2015.
Simonyan et al., "Very deep convolutional networks for large-scale image recognition", arXiv e-print arXiv:1409.1556v6, Apr. 10, 2015 in 14 pages.
Song et al., "Deep Sliding Shapes for Amodal 3D Object Detection in RGB-D Images", Proceedings of the IEEE Conference on Computer Vision and Pattern Recognition. Jun. 27-30, 2016 (pp. 808-816).
Song et al., "Sliding Shapes for 3D Object Detection in Depth Images", in European Conference on Computer Vision, (Sep. 6, 2014) Springer Publishing (pp. 634-651).
Song et al., "Sun RGB-D: A RGB-D Scene Understanding Benchmark Suite," In CVPR, 2015.
Su et al., "Render for CNN: Viewpoint Estimation in Images Using CNNs Trained with Rendered 3D Model Views", in Proceedings of the IEEE International Conference on Computer Vision, Dec. 7-13, 2015 (pp. 2686-2694).
Szegedy et al., "Going deeper with convolutions", arXiv:1409.4842v1, Sep. 17, 2014 in 12 pages.
Szegedy et al., "Rethinking the Inception Architecture for Computer Vision", arXiv e-print arXIV:1512.00567v3, Dec. 12, 2015 in 10 pages.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Tompson et al., "Joint Training of a Convolutional Network and a Graphical Model for Human Pose Estimation," In NIPS, 2014.
Tu et al., "Auto-context and Its Application to High-level Vision Tasks," In CVPR, 2008. 978-1-4244-2243-2/08, IEEE.
Tulsiani S. et al., "Viewpoints and Keypoints", Proceedings of the IEEE Conference on Computer Vision and Pattern Recognition; Jun. 7-12, 2015 (pp. 1510-1519).
Villanueva, A. et al., "A Novel Gaze Estimation System with One Calibration Point", IEEE Transactions on Systems, Man, and Cybernetics—Part B:Cybernetics, vol. 38:4, Aug. 2008, in 16 pages.
Wikipedia: "Convolution", Wikipedia, accessed Oct. 1, 2017, in 17 pages. URL: https://en.wikipedia.org/wiki/Convolution.
Wikipedia: "Deep Learning", Wikipedia, printed Oct. 3, 2017, in 23 pages. URL: https://en.wikipedia.org/wiki/Deep_learning.

(56) References Cited

OTHER PUBLICATIONS

Wilczkowiak et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.
Wu et al., "Single Image 3D Interpreter Network", arXiv e-print arXiv:1604.08685v2, Oct. 4, 2016 in 18 pages.
Xiang Y. et al., "Data-Driven 3D Vox el Patterns for Object Category Recognition", in Proceedings of the IEEE Conference on Computer Vision and Pattern Recognition, Jun. 7-12, 2015 (pp. 1903-1911).
Xiao et al., "Reconstructing the Worlds Museums," IJCV, 2014.
Xiao et al., "Sun database: Large-scale scene recognition from abbey to zoo," In CVPR, 2010 IEEE Conference on 2010, 3485-3492.
Xiao J. et al., "Localizing 3D cuboids in single-view images", in Advances in Neural Information Processing Systems 25. F. Pereira et al. [Eds.] Dec. 2012 (pp. 746-754).
Yang et al., "Articulated human detection with flexible mixtures of parts", IEEE Transactions on Pattern Analysis and Machine Intelligence. Dec. 2013; 35(12):2878-90.
Zhang et al., "Estimating the 3D Layout of Indoor Scenes and its Clutter from Depth Sensors," in ICCV, 2013.
Zhang et al., Large-scale Scene Understanding Challenge: Room Layout Estimation, 2016.
Zhao et al., "Scene Parsing by Integrating Function, Geometry and Appearance Models," In CVPR, 2013.
Zheng et al., "Conditional Random Fields as Recurrent Neural Networks," In CVPR, 2015.
Zheng et al., "Interactive Images: Cuboid Pro ies for Smart Image Manipulation", ACM Trans Graph. (Jul. 2012) 31(4):99-109.

\* cited by examiner

| Type | KERNEL SIZE/STRIDE OR REMARKS | INPUT SIZE WxHxCh |
|---|---|---|
| L2 NORMALIZATION 318 | | 21x21x1 |
| CONV 314 + SOFTSIGN 316 | 1x1/1 | 21x21x64 |
| ReLU 312 | | 21x21x64 |
| INCEPTION-LIKE LAYER 310 | CONCATENATION OF 1x1, 3x3, 5x5 CONVOLUTIONS WITH DIMENSION REDUCTION | 21x21x64 |
| MAXPOOL 308c | 2x2/2 | 43x43x64 |
| CONV 304c + ReLU 306c | 5x5/1 | 47x47x32 |
| MAXPOOL 308b | 2x2/2 | 94x94x32 |
| CONV 304b + ReLU 306b | 5x5/1 | 98x98x16 |
| MAXPOOL 308a | 2x2/2 | 196x196x16 |
| CONV 304a + ReLU 306a | 5x5/1 | 200x200x1 |
| LOCAL CONTRAST NORMALIZATION 302 | 9x9/1 | 208x208x1 |

*FIG. 3*

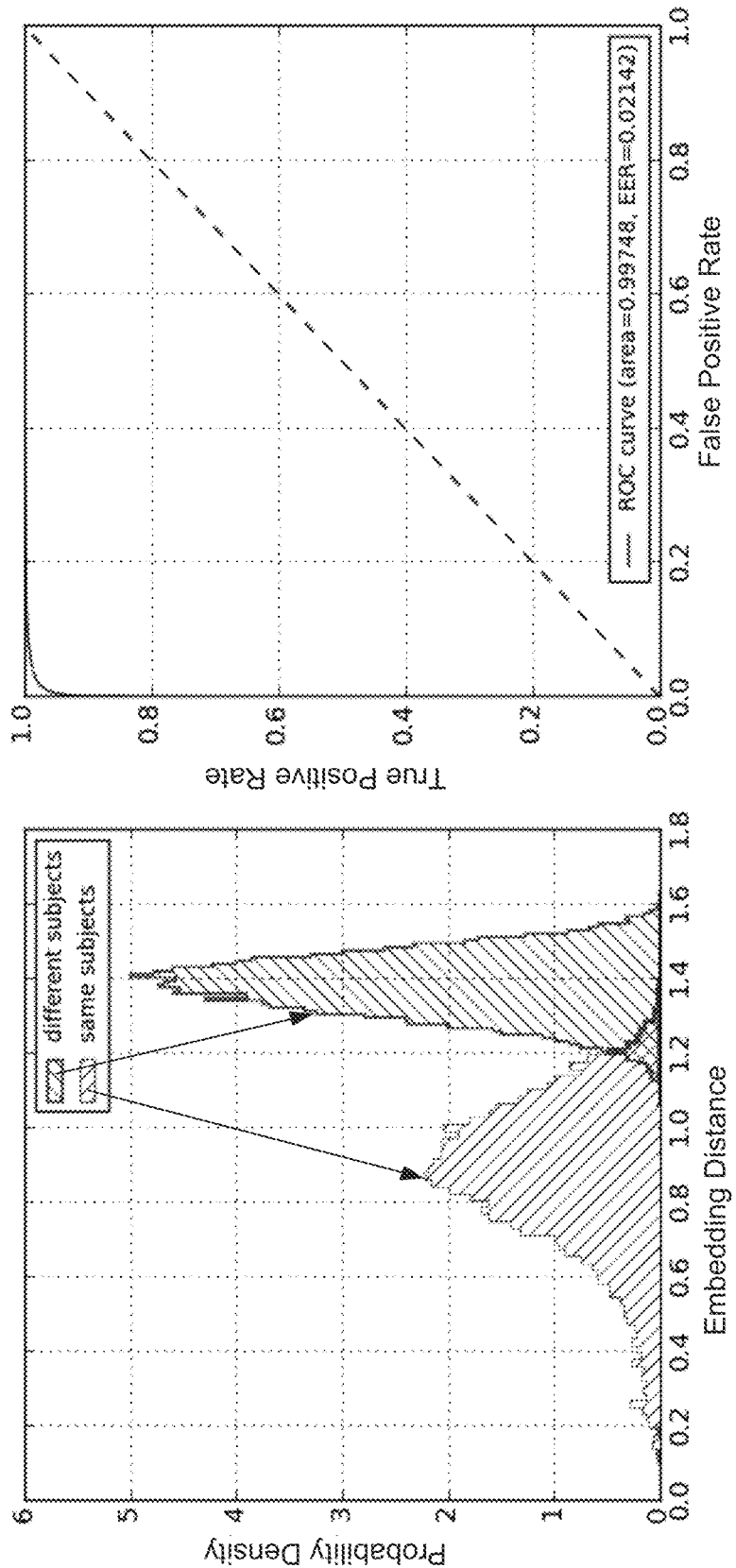

DEEP NEURAL NETWORK FOR IRIS IDENTIFICATION

CROSS-REFERENCE TO RELATED APPLICATIONS

This application is a continuation of U.S. patent application Ser. No. 15/497,927, filed Apr. 26, 2017, entitled "DEEP NEURAL NETWORK FOR IRIS IDENTIFICATION," which claims the benefit of priority to Russian Patent Application Number 2016128792, filed Jul. 14, 2016, entitled "DEEP NEURAL NETWORK FOR IRIS IDENTIFICATION," the contents of which are hereby incorporated by reference herein in their entirety.

BACKGROUND

Field

The present disclosure relates generally to systems and methods for iris identification and more particularly to using a deep neural network for iris identification.

Description of the Related Art

In the field of personal biometric identification, one of the most effective known methods is to use the naturally occurring patterns in the human eye, predominantly the iris or the retina. In both the iris and the retina, patterns of color, either from the fibers of the stroma in the case of the iris or from the patterns of blood vessels in the case of the retina, are used for personal biometric identification. In either case, these patterns are generated epigenetically by random events in the morphogenesis of this tissue; this means that they will be distinct for even genetically identical (monozygotic) twins.

A conventional iris code is a bit string extracted from an image of the iris based on features designed by humans. To extract the iris code, an eye image is segmented to separate the iris form the pupil and sclera, the segmented image is mapped into pseudo-polar coordinates, and phase information is extracted using complex-valued two-dimensional wavelets (e.g., Gabor or Haar). A typical iris code is a bit string based on the signs of the wavelet convolutions and has 2048 bits. The iris code may be accompanied by a mask with an equal number of bits that signify whether an analyzed region was occluded by eyelids, eyelashes, specular reflections, or corrupted by noise. Use of such an iris code is the standard for many common iris-based biometric tasks such as identification of passengers from passport data.

SUMMARY

In one aspect, a wearable display system is disclosed. The wearable display system comprises: a display; an image capture device configured to capture a first image of an eye of a user; non-transitory memory configured to store: a deep neural network for processing the first image of the eye, a classifier for processing the processed first image of the eye, and executable instructions; and a hardware processor in communication with the display, the image capture device, and the non-transitory memory, the hardware processor programmed by the executable instructions to: receive the first image of the eye; process the first image of the eye using the deep neural network to generate an embedding space representation; and process the embedding space representation using the classifier to calculate a likelihood score that the first image of the eye is an image of an eye of an authorized user.

In another aspect, a head mounted display system is disclosed. The head mounted display system comprises: a display; an image capture device configured to capture a first image of an eye of a user; non-transitory memory configured to store: a deep neural network for processing the first image of the eye, a classifier for processing the processed first image of the eye, and executable instructions; and a hardware processor in communication with the display, the image capture device, and the non-transitory memory, the hardware processor programmed by the executable instructions to: receive the first image of the eye; process the first image of the eye to generate a representation of the first image of the eye in polar coordinates; process the representation of the first image of the eye in polar coordinates using the deep neural network to generate an embedding space representation; and process the embedding space representation using the classifier to generate a likelihood score that the image of the eye is an image of the authorized user's eye.

In yet another aspect, a wearable display system is disclosed. The wearable display system comprises: a display; an image capture device configured to capture a first image of a first eye of a user and a second image of a second eye of the user; non-transitory memory configured to store: a deep neural network for processing the first image of the first eye and the second image of the second eye, a classifier for processing the processed first image of the first eye and the processed second image of the second eye, and executable instructions; and a hardware processor in communication with the display, the image capture device, and the non-transitory memory, the hardware processor programmed by the executable instructions to: receive the first image of a first eye and the second image of a second eye; process the first image of the first eye and the second image of the second eye using the deep neural network to generate a first embedding space representation of the first eye and a second embedding space representation of the second eye; and process the first embedding space representation and the second embedding space representation using the classifier to generate a likelihood score that the first image of the first eye is an image of the authorized user's left eye and the second image of the second eye is an image of the authorized user's right eye.

In a further aspect, a wearable display system is disclosed. The wearable display system comprises: a display; an image capture device configured to capture a first image of an eye; a biometric information capture device configured to capture at least one other biometric information; non-transitory memory configured to store: a deep neural network for processing the first image of the eye, a classifier for processing the processed first image of the eye, and executable instructions; and a hardware processor in communication with the display, the biometric information capture device, the image capture device, and the non-transitory memory, the hardware processor programmed by the executable instructions to: receive the first image of an eye and the at least one other biometric information; process the image of the eye and the at least one other biometric information using the deep neural network to generate an embedding space representation; and process the embedding space representation using the classifier to generate a likelihood score that the image of the eye is an image of an eye of the authorized user and the at least one other biometric information is a biometric information of the authorized user.

In another aspect, a wearable display system is disclosed. The wearable display system comprises: a display; an image capture device configured to capture a first image of an eye; a biometric information capture device configured to capture at least one other biometric information; non-transitory memory configured to store: a first deep neural network for processing the first image of the eye, a classifier for processing the processed first image of the eye, and executable instructions; and a hardware processor in communication with the display, the biometric information capture device, the image capture device, and the non-transitory memory, the hardware processor programmed by the executable instructions to: receive the first image of the eye; process the first image of the eye using the first deep neural network to generate a first embedding space representation; receive at least one other biometric information; and process the first embedding space representation and the at least one other biometric information using the classifier to generate a likelihood score that the image of the eye is an image of an eye of the authorized user and the at least one other biometric information is a biometric information of the authorized user.

In yet another aspect, a wearable display system is disclosed. The wearable display system comprises: a display; an image capture device configured to capture a plurality of first images of a first eye of a user; non-transitory memory configured to store: a deep neural network for processing the plurality of first images of the first eye, a first classifier for processing the processed plurality of first images of the first eye, and executable instructions; and a hardware processor in communication with the display, the image capture device, and the non-transitory memory, the hardware processor programmed by the executable instructions to: receive the plurality of first images of the first eye; process the plurality of first images of the first eye using the deep neural network to generate a first embedding space representation; and process the first embedding space representation using the first classifier to calculate a first likelihood score that the plurality of first images of the first eye comprises an image of a first eye of an authorized user.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 3 shows a table illustrating an example deep network architecture.

FIG. 4A is a histogram plot of the ratio of samples vs. embedding distance, showing the embedding distance between eye images of the same subjects and different subjects. FIG. 4B is a receiver operating characteristic (ROC) curve of true positive rate (TPR) vs. false positive rate (FPR).

FIGS. 5A and 5B show example results of learning an embedding using a deep neural network with the deep network architecture illustrated in FIGS. 1-3 after 50,000 iterations. The deep neural network was trained using groups of six successive polar images as 6-channel inputs. FIG. 5A is a histogram plot of the probability density vs. embedding distance, showing the embedding distance between pairs of groups of polar images of the same subjects and different subjects. FIG. 5B is a receiver characteristic (ROC) curve of true positive rate (TPR) vs. false positive rate (FPR).

Figure 1:
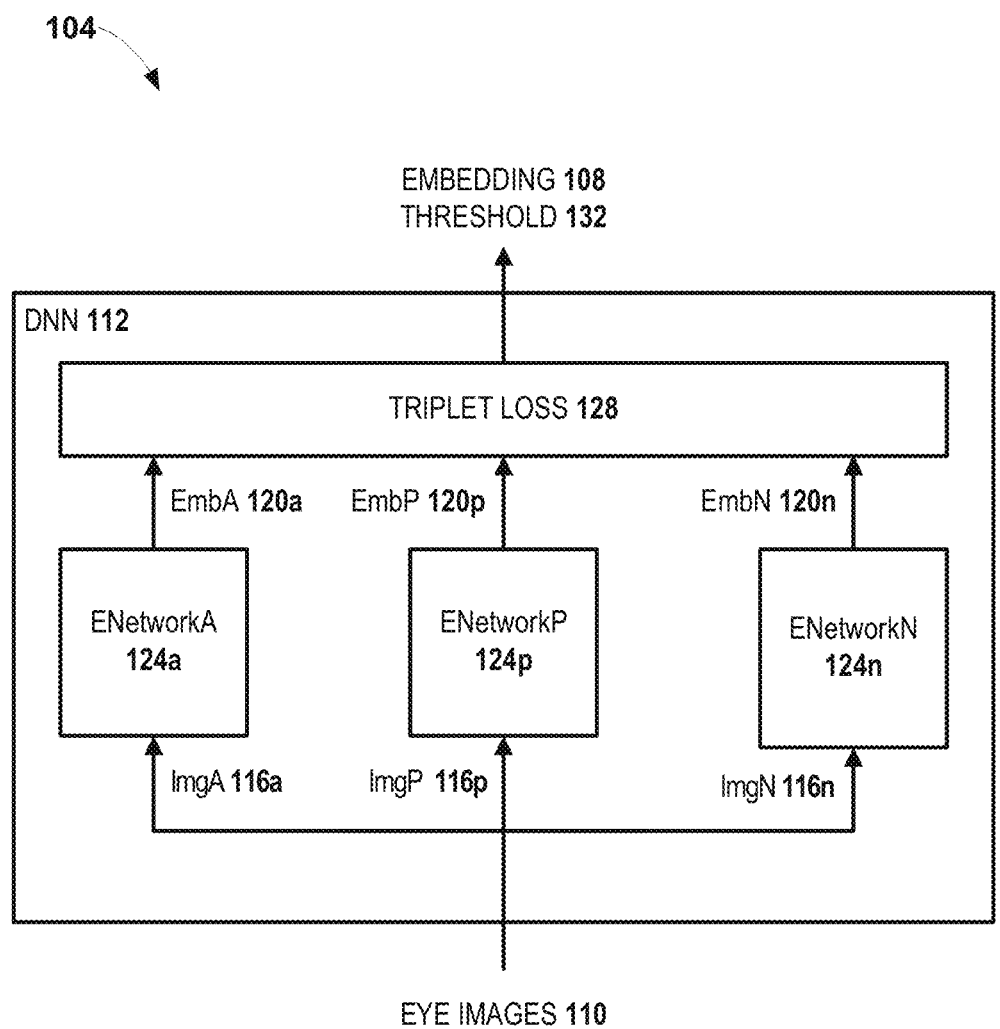
FIG. 1 is a block diagram of an example of an eye authentication trainer implementing a deep neural network with a triplet network architecture.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A conventional wavelet-based iris code has 2048 bits. However, only approximately 244 bits are statistically independent. This statistical dependence indicates that the iris code based on features designed by humans (e.g., the signs of the convolutions with a particular set of wavelets) is inefficient at representing the iris. Furthermore, the iris code can be sensitive to variations including image cropping, image blurring, lighting conditions while capturing images, occlusion by eyelids and eyelashes, and image angle of view. Additionally, prior to computing the iris code, an eye image needs to be segmented to separate the iris from the pupil and the surrounding sclera.

Systems and methods disclosed herein address various challenges related to generation of an eye descriptor that represents iris features. For example, a deep neural network (DNN) can be used to learn an embedding for iris identification. The DNN can also be used to learn an embedding for verification of identification of people. This embedding can allow human irises to be classified in a novel way, by using a location in an embedding space, rather than a conventional iris code. The embedding space may not be designed by human beings (as with wavelet-based iris codes), but rather learned from training data by the DNN.

DNNs can be used successfully to learn, from training data, highly efficient embeddings in Euclidean spaces. Once a mapping is learned from the native space of the data (e.g., iris images) to the embedding space, the embedding space can be used to determine similarity of two images based on the proximity of the images in the embedding space. One architecture of DNN that can accomplish this is a triplet network.

Different DNNs can be different from one another in two ways. The architecture of the DNNs, for example the number of layers and how the layers are interconnected, can be different. The weights which can affect the strength of effect propagated from one layer to another can be different. The output of a layer can be some nonlinear function of the weighted sum of its inputs. The weights of a DNN can be the weights that appear in these summations, and can be approximately analogous to the synaptic strength of a neural connection in a biological system.

The process of training a DNN is the process of presenting the DNN with both input data and corresponding target output data. This data, the training set, can include both example inputs and target outputs. Through the process of training, the weights of the network can be incrementally learned such that the output of the network, given a particular piece of input data from the training set, comes to match (as closely as possible) the target output corresponding to that piece of input data.

Thus, in some implementations, a DNN having a triplet network architecture is trained, using images of the human eye, to learn an embedding that maps from the higher dimensional eye image space to a lower dimensional embedding space (which may be Euclidean or non-Euclidean). The embedding can be a DNN. Once learned, this embedding can be used as an alternative to conventional wavelet-based iris codes. The codes determined from the embedding may be n-dimensional real numbered vectors, rather than the bit strings of the wavelet-based codes (although a bit-based representation of the vectors may be stored and utilized in biometric processing). In various implementations, the DNN may be trained with segmented iris images, or the DNN can be trained directly to images of the periocular region of the eye (without first segmenting the periocular images). In the latter case, the DNN can learn that the data in the iris is of particularly high value, but it can also make use of the periocular portions of the image if doing so aids in iris feature identification. The periocular region includes the eye and portions around the eye such as, e.g., eyelids, eyebrows, eyelashes, and skin surrounding the eye (which may have unique texture). For example, the particular structure of a person's tear ducts may provide identifying information. Accordingly, analysis of the periocular region by the DNN may provide a more robust biometric signature (via the embedding) than analysis of just the iris alone.

Example Triplet Network Architecture

Using images of the human eye, a deep neural network (DNN) with a triplet network architecture can be trained to learn an embedding that maps from the higher dimensional eye image space to a lower dimensional embedding space. The dimensionality of the eye image space can be quite large. For example, an eye image of 256 pixels by 256 pixels can potentially include thousands or tens of thousands of degrees of freedom. FIG. 1 is a block diagram of an example of an eye authentication trainer 104 implementing a deep neural network with a triplet network architecture. The eye authentication trainer 104 can train a deep neural network to learn an embedding 108 (Emb). The embedding 108 can be a function that maps an eye image (Img) in the higher dimensional eye image space into an embedding space representation (EmbImg) of the eye image in a lower dimensional embedding space. For example, Emb(Img) =EmbImg. The embedding 108 can be a DNN.

The embedding space representation, a representation of the eye image in the embedding space, can be an n-dimensional real number vectors. The embedding space representation of an eye image can be an n-dimensional eye description. The dimensionality of the representations in the embedding space can be different in different implementations. For example, the dimensionality can be in a range from 16 to 2048. In some implementations, n is 128. The elements of the embedding space representations can be represented by Booleans, integers, real numbers, complex numbers, or any combination thereof. In some architectures, the embedding space representation is represented as n floating point numbers during training but it may be quantized to n bytes for authentication. Thus, in some cases, each eye image is represented by an n byte representation. Representations in an embedding space with larger dimensionality may perform better than those with lower dimensionality but may require more training. The embedding space representation can have, for example, unit length.

The deep neural network 112 can be trained to learn the embedding 108 such that the distance between eye images, independent of imaging conditions, of one person (or of one person's left or right eye) in the embedding space is small because they are clustered together in the embedding space. In contrast, the distance between a pair of eye images of different persons (or of a person's different eyes) can be large in the embedding space because they are not clustered together in the embedding space. Thus, the distance between the eye images from the same person in the embedding space, the embedding distance, can be smaller than the distance between the eye images from different persons in the embedding space. The distance between two eye images can be, for example, an Euclidian distance (such as an L2 norm), or a non-Euclidian distance (e.g., in a hyperbolic space), between the embedding space representations of the two eye images.

The distance between two eye images of one person, for example an anchor eye image (ImgA) 116a and a positive eye image (ImgP) 116p, can be small in the embedding space. The distance between two eye images of different persons, for example the anchor eye image (ImgA) 116a and a negative eye image (ImgN) 116n can be larger in the embedding space. The ImgA 116a is an "anchor" image because its embedding space representation can be compared to embedding space representations of eye images of the same person (e.g., the ImgP 116p) and different persons (e.g., ImgN 116n). ImgA 116p is a "positive" image because the ImgP 116p and the ImgA 116a are eye images of the same person. The ImgN 116n is a "negative" image because the ImgN 116n and the ImgA 116a are eye images of different persons. Thus, the distance between the ImgA 116a and the ImgP 116p in the embedding space can be smaller than the distance between the ImgA 116a and the ImgN 116N in the embedding space.

The embedding (Emb) 108 can map the ImgA 116a, the ImgP 116p, and the ImgN 116n from the higher dimensional eye image space into an anchor embedding image (EmbA) 120a, a positive embedding image (EmbP) 120a, and a negative embedding image (EmbN) 120n, respectively. For example, Emb(ImgA)=EmbA; Emb(ImgP)=EmbP; and Emb(ImgN)=EmbN. Thus, the distance between the EmbA 120a and the EmbP 120a in the embedding space can be smaller than the distance between EmbP 120a and EmbN 120n in the embedding space.

To learn the embedding 108, the eye authentication trainer 104 can receive a training set T1 of eye images 110. An eye image 110 can be an image of the periocular region of an eye. Or an eye image 110 can be a segmented iris image or a segmented retina image. The eye images 110 can include the images of left eyes and right eyes. The eye images 110 can be associated with labels, where the labels distinguish the eye images of one person from eye images of another person. The labels can also distinguish the eye images of the left eye and the right eye of a person. The training set T1 received by the eye authentication trainer 104 can include pairs of eye image and label (Img; Label). The eye authentication trainer 104 can receive the training set T1 of (Img; Label) pairs from an eye image data store.

The eye authentication trainer 104 can utilize a deep neural network (DNN) 112 with a triplet network architecture to learn the embedding 108. To learn the embedding 108, the triplet network architecture can include three identical embedding networks (also referred to as embeddings, deep embeddings, deep embedding networks, DNN embeddings, or DNNs), for example an anchor embedding network (ENetworkA) 124a, a positive embedding network (ENetworkP) 124p, and a negative embedding network (ENetworkN) 124n. The embedding networks 124a, 124p, or 124n can be deep neural networks. The embedding networks 124a, 124p, or 124n can map eye images from the eye image space into embedding space representations of the eye images in the embedding space. For example, the ENetworkA 124a can map an ImgA 116a into an EmbA 120a. The ENetworkA 124p can map an ImgP 116p into an EmbP 120p. The ENetworkN 124n can map an ImgN 116n into an EmbN 120n.

In some implementations, the eye authentication trainer 104 can utilize a deep neural network (DNN) 112 with a single network architecture to learn the embedding 108. To learn the embedding 108, the single network architecture can include one embedding network. The embedding network can map triplets of (ImgA; ImgP; ImgN) into triplets of (EmbA; EmbP; EmbN).

The deep neural network 112 with the triplet network architecture can learn the embedding 108 with a triplet training set T2 including triplets of eye images. Two eye images of a triplet can be from the same person, for example the ImgA 116a and the ImgP 116p. The third eye image of the triplet can be from a different person or a different eye of the same person, for example the ImgN 116n. The ENetworkA 124a, the ENetworkP 124p, and the ENetworkN 124n can map a triplet of (ImgA; ImgP; ImgN) into a triplet of (EmbA; EmbP; EmbN). The eye authentication trainer 104 can generate the triplet training set T2 from the training set T1 of (Img; Label) pairs.

The ImgA 116a, the ImgP 116p, or the ImgN 116n can be different in different implementations. For example, the ImgA 116a and the ImgP 116p can be eye images of one person, and the ImgN 116n can be an eye image of another person. As another example, the ImgA 116a and the ImgP 116p can be images of one person's left eye, and the ImgN 116n can be an image of the person's right eye or an eye image of another person.

The triplet network architecture can be used to learn the embedding 108 such that an eye image of a person in the embedding space is closer to all other eye images of the same person in the embedding space than it is to an eye image of any other person in the embedding space. For example, |EmbA−EmbP|<|EmbA−EmbN|, where |EmbA−EmbP| denotes the absolute distance between the EmbA 120a and the EmbP 120p in the embedding space, and |EmbA−EmbN| denotes the absolute distance between the EmbA 120a and the EmbN 120n in the embedding space.

In some implementations, the triplet network architecture can be used to learn the embedding 108 such that an image of a person's left eye in the embedding space is closer to all images of the same person's left eye in the embedding space than it is to any image of the person's right eye or any eye image of another person in the embedding space.

The dimensionality of the embedding space representations can be different in different implementations. The dimensionality of the EmbA 120a, EmbP 120p, and EmbN 120n can be the same, for example 431. The length of the embedding space representation can be different in different implementations. For example, the EmbA 120a, EmbP 120p, or EmbN 120n can be normalized to have unit length in the embedding space using L2 normalization. Thus, the embedding space representations of the eye images are on a hypersphere in the embedding space.

The triplet network architecture can include a triplet loss layer 128 configured to compare the EmbA 120a, the EmbP 120p, and the EmbN 120n. The embedding 108 learned with the triplet loss layer 128 can map eye images of one person onto a single point or a cluster of points in close proximity in the embedding space. The triplet loss layer 128 can minimize the distance between eye images of the same person in the embedding space, for example the EmbA 120a and the EmbP 120p. The triplet loss layer 128 can maximize the distance between eye images of different persons in the embedding space, for example EmbA 120a, and the EmbN 120n.

The triplet loss layer 128 can compare the EmbA 120a, the EmbP 120p, and the EmbN 120n in a number of ways. For example, the triplet loss layer 128 can compare the EmbA 120a, the EmbP 120p, and the EmbN 120n by computing:

$$\text{Maximum}(0, |\text{EmbA}-\text{EmbP}|^2 - |\text{EmbA}-\text{EmbN}|^2 + m), \quad \text{Equation (1.1)}$$

where |EmbA−EmbP| denotes the absolute distance between the EmbA 120a and the EmbP 120p in the embedding space, |EmbA−EmbN| denotes the absolute distance between the EmbA 120a and the EmbN 120n, and m denotes a margin. The margin can be different in different implementations. For example, the margin can be 0.20. Thus, in some implementations, the embedding 108 can be learned from eye images of a plurality of persons, such that the distance in the embedding space between the eye images from the same person is smaller than the distance in the embedding space between eye images from different persons. In some embodiments, the distance in the embedding space between the eye images from an eye of a person is smaller than the distance in the embedding space between eye images from different persons or eye images of different eyes of the same person. In terms of the particular implementation of Equation (1.1), the squared distance in the embedding space between all eye images from the same person is small, and the squared distance in the embedding space between a pair of eye images from different persons is large. As another example, the triplet loss layer 128 can compare the EmbA 120a, the EmbP 120p, and the EmbN 120n by computing:

$$\text{Maximum}(0, |\text{EmbA}-\text{EmbP}+m1|^{m2} - |\text{EmbA}-\text{EmbN}+m1|^{m2} + m3), \quad \text{Equation (1.2)}$$

where |EmbA−EmbP| denotes the absolute distance between the EmbA 120a and the EmbP 120p in the embedding space, |EmbA−EmbN| denotes the absolute distance between the EmbA 120a and the EmbN 120n, m1 denotes a modifier of the distance between two embedding space representations, m2 denotes a modifier of the absolute distance between two embedding space representations, and m3 denotes a margin. The modifiers m1 and m2 can be different in different implementations. For example, the modifier can be an integer (e.g., 3), a real number (e.g., 3.1), or a complex number. The margin m3 can be different in different implementations. For example, the margin can be 0.20.

The function of the margin m used in comparing the EmbA 120a, the EmbP 120p, and the EmbN 120n can be different in different implementations. For example, the margin m can enforce a margin between each pair of eye images of one person and eye images of all other persons in the embedding space. Accordingly, the embedding space representations of one person's eye images can be clustered closely together in the embedding space. At the same time, the embedding space representations of different persons' eye images can be maintained or maximized. As another example, the margin m can enforce a margin between each pair of images of one person's left eye and images of the person's right eye or eye images of all other persons.

During an iteration of the learning of the embedding 108, the triplet loss layer 128 can compare the EmbA 120*a*, the EmbP 120*p*, and the EmbN 120*n* for different numbers of triplets. For example, the triplet loss layer 128 can compare the EmbA 120*a*, the EmbP 120*p*, and the EmbN 120*n* for all triplets (EmbA; EmbP; EmbN) in the triplet training set T2. As another example, the triplet loss layer 128 can compare the EmbA 120*a*, the EmbP 120*p*, and EmbN 120*n* for a batch of triplets (EmbA; EmbP; EmbN) in the triplet training set T2. The number of triplets in the batch can be different in different implementations. For example, the batch can include 64 triplets of (EmbA; EmbP; EmbN). As another example, the batch can include all the triplets (EmbA; EmbP; EmbN) in the triplet training set T2.

During an iteration of the learning the embedding 108, the triplet loss layer 128 can compare the EmbA 120*a*, the EmbP 120*p*, and the EmbN 120*n* for a batch of triplets (EmbA; EmbP; EmbN) by computing a triplet loss. The triplet loss can be, for example, $$\Sigma_{i=1}^{n} \text{Maximum}(0, |\text{EmbA}(i) - \text{EmbP}(i)|^2 - |\text{EmbA}(i) - \text{EmbN}(i)|^2 + m), \quad \text{(Equation 2.1)}$$

where n denotes the number of triplets in the batch of triplets; EmbA(i), EmbP(i), EmbN(i) denotes the ith EmbA 120*a*, EmbP 120*p*, and EmbN 120*n* in the batch of triplets; and m denotes a margin. As another example, the triplet loss can be $$\Sigma_{i=1}^{n} \text{Maximum}(0, |\text{EmbA}(i) - \text{EmbP}(i) + m1|^{m2} - |\text{EmbA}(i) - \text{EmbN}(i) + m1|^{m2} + m3), \quad \text{(Equation 2.2)}$$

where n denotes the number of triplets in the batch of triplets; EmbA(i), EmbP(i), and EmbN(i) denotes the ith EmbA 120*a*, EmbP 120*p*, and EmbN 120*n* in the batch of triplets; m1 denotes a modifier of the distance between two embedding space representations; m2 denotes a modifier of the absolute distance between two embedding space representations; and m3 denotes a margin.

During the learning of the embedding 108, the eye authentication trainer 104 can update the ENetworkA 124*a*, the ENetworkP 124*p*, and the ENetworkN 124*n* based on the comparison between a batch of triplets (EmbA; EmbP; EmbN), for example the triplet loss between a batch of triplets (EmbA; EmbP; EmbN). The eye authentication trainer 104 can update the ENetworkA 124*a*, the ENetworkP 124*p*, and the ENetworkN 124*n* periodically, for example every iteration or every 1,000 iterations. The eye authentication trainer 104 can update the ENetworkA 124*a*, the ENetworkP 124*p*, and the ENetworkN 124*n* to optimize the embedding space. Optimizing the embedding space can be different in different implementations. For example, optimizing the embedding space can include minimizing Equation 1.1 (or Equation 1.2). As another example, optimizing the embedding space can include minimizing the distance between the EmbA 120*a* and the EmbP 120*p* and maximizing the distance between the EmbA 120*a* and the EmbN 120*n*.

After iterations of optimizing the embedding space, the eye authentication trainer 104 can compute as its output one or more of: an embedding 108 that maps eye images from the higher dimensional eye image space into representations of the eye images in a lower dimensional embedding space; or a threshold value 132 for a user device to determine whether the embedding space representation of an user's eye image is similar enough to an authorized user's eye image in the embedding space such that the user should be authenticated as the authorized user. The eye authentication trainer 104 can determine the embedding 108 or the threshold value 132 without a service operator having to specify the features of eye images that the eye authentication trainer 104 can or should use in computing the embedding 108 or the threshold value 132.

The threshold value 132 can be different in different implementations. For example, the threshold value 132 can be the largest distance between eye images of the same person determined from the (ImgA; ImgP; ImgN) triplets during the last iteration of learning the embedding 108. As another example, the threshold value 132 can be the median distance between eye images of the same person determined from the (ImgA; ImgP; ImgN) triplets during the last iteration of learning the embedding 108. As yet another example, the threshold value 132 can be smaller than the largest distance between eye images of the different persons determined from the (ImgA; ImgP; ImgN) triplets during the last iteration of learning the embedding 108.

The number of iterations required to learn the embedding 108 can be different in different implementations. For example, the number of iterations can be 100,000. As another example, the number of iterations may not be predetermined and can depend on iterations required to learn an embedding 108 with satisfactory characteristics such as having an equal error rate (EER) of 2%. As yet another example, the number of iterations can depend on iterations required to obtain a satisfactory triplet loss.

The ability of the embedding 108 to distinguish unauthorized users and authorized users can be different in different implementations. For example, the false positive rate (FPR) of the embedding 108 can be 0.01%; and the true positive rate (TPR) of the embedding 108 can be 99.99%. As another example, the false negative rate (FNR) of the embedding 108 can be 0.01%; and the true negative rate (TNR) of the embedding 108 can be 99.99%. The equal error rate (EER) of the embedding 108 can be 1%, for example.

The eye authentication trainer 104 can implement a deep neural network 112 having an architecture other than the triplet network architecture to learn the embedding 108. Non-limiting examples of the architecture of the deep neural network 112 include a deep belief network architecture, a Boltzmann machine architecture, a restricted Boltzmann machine architecture, a deep Boltzmann machine architecture, or a deep auto-encoder architecture.

Example Deep Neural Network

The eye authentication trainer 104 can train a deep neural network 112 to learn an embedding 108. The deep neural network 112 can include one or more deep neural network layers. A deep neural network layer can apply linear or non-linear transformations to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have mean of zero and variance of one (or other values of mean and variance). Local response normalization can normalize an image over local input regions to have mean of zero and variance of one (or other values of mean and variance). The normalization layer may speed up the computation of the embedding 108.

The convolutional layer can apply a set of kernels that convolve its input to generate its output. The softsign layer can apply a softsign function to its input. The softsign function (softsign(x)) can be, for example, (x/(1+|x|)). The softsign layer may neglect impact of per-element outliers. A per-element outlier for an embedding space can be a triplet (ImgA; ImgP; ImgN) where the distance in the embedding space between ImgA 116a and ImgP 116p is larger than the distance in the embedding space between ImgA 116a and ImgN 116n. A per-element outlier may occur because of eyelid occlusion or accidental bright spot in the eye images or segmented iris images.

The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number.

The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input.

Figure 2:
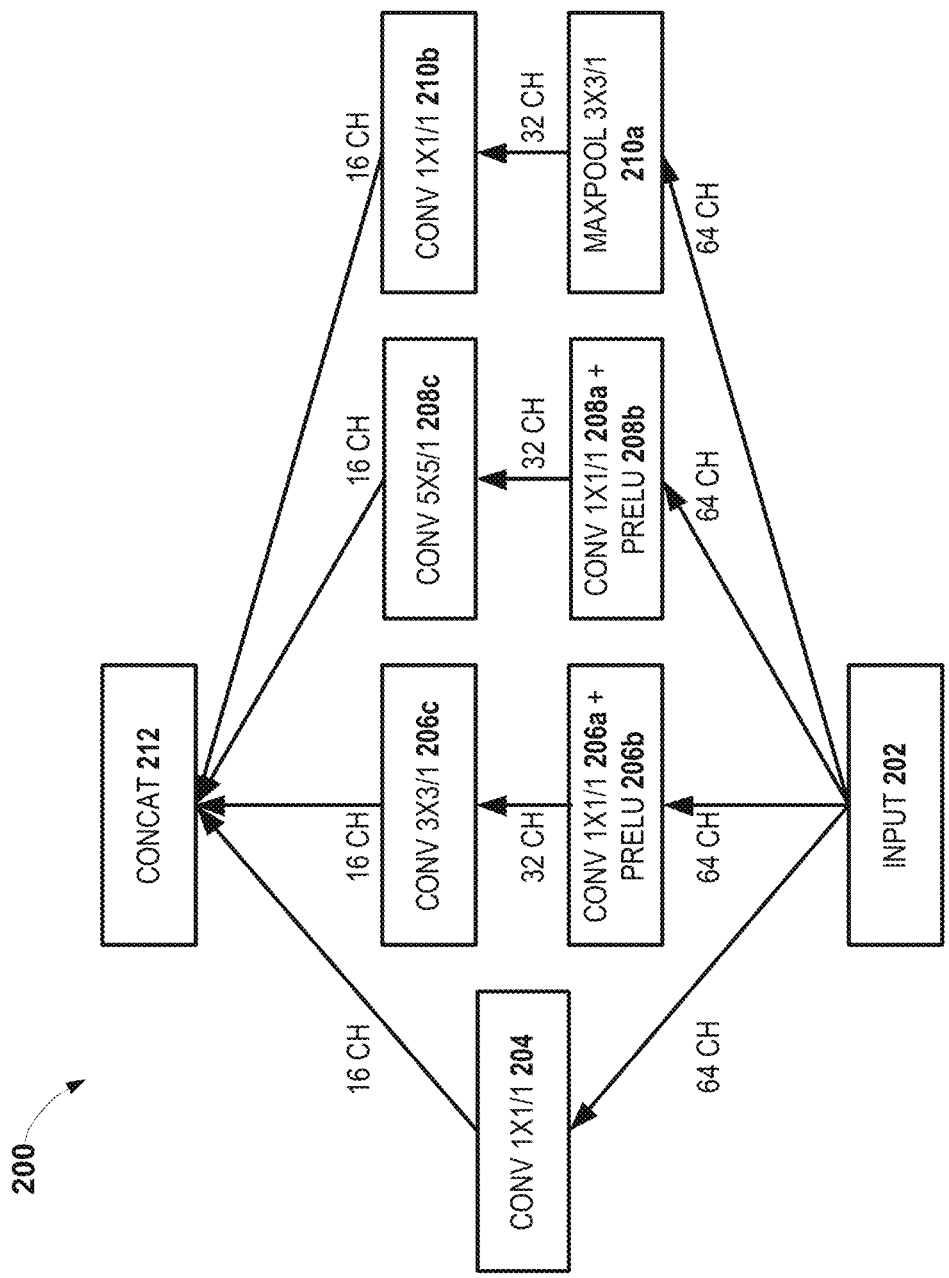
FIG. 2 depicts an example architecture of an inception-like layer.

The inception-like layer can include one or more of the normalization layer, the convolutional layer, the softsign layer, the rectified linear layer such as the ReLU layer and the PReLU layer, the concatenation layer, the pooling layer, or any combination thereof. FIG. 2 depicts an example architecture of an inception-like layer 200. The inception-like layer 200 can process its input 202 using one or more convolutional layers (e.g., a convolutional layer 204) and one or more combinations of convolutional layers, PReLU layers, and a maximum pooling layer (e.g., three combinations of convolutional layers, PReLU layers, and a maximum pooling layer). The convolutional layer 204 can receive 64 channels of the input 202 with width and height of 21 by 21 to generate its output with 16 channels and width and height of 21 by 21. The kernel size and the stride of the convolutional layer 204 can be 1×1 and 1 respectively.

A convolutional layer 206a and a PReLU layer 206b can convolve and transform 64 channels of the input 202 to generate an output with 32 channels. The kernel size and the stride of the convolutional layer 206a can be 1×1 and 1 respectively. A convolutional layer 206C can use the output of the convolutional layer 206a and the PReLU layer 206b as its input to generate its output with 16 channels. The kernel size and the stride of the convolutional layer 206c can be 3×3 and 1 respectively.

A convolutional layer 208a and a PReLU layer 208b can convolve and transform 64 channels of the input 202 to generate an output with 32 channels. The kernel size and the stride of the convolutional layer 208a can be 1×1 and 1 respectively. A convolutional layer 208c can use the output of the convolutional layer 208a and the PReLU layer 208b as its input to generate its output with 16 channels. The kernel size and the stride of the convolutional layer 208c can be 5×5 and 1 respectively.

A maximum pooling layer 210a can reduce the dimensionality of 64 channels of the input 202 to generate its output with 32 channels. The kernel size and the stride of the maximum pooling layer 210a can be 3×3 and 1 respectively. A convolutional layer 210b may convolve the output of the maximum pooling layer 210a to generate its output of 16 channels. The kernel size and the stride of the maximum pooling layer 210a can be 1×1 and 1 respectively. A concatenation layer 212 can concatenate the 16-channel outputs of the convolutional layers 204, 206c, 208c, and 210b to generate its output with size 21×21×64.

The number of the deep neural network layers in the deep neural network 112 can be different in different implementations. For example, the number of the deep neural network layers in the deep neural network 112 can be 100. The input type of a deep neural network layer can be different in different implementations. For example, a deep neural network layer can receive a training set T1 of (Img; Label) pairs as its input. As another example, a deep neural network layer can receive a triplet training set T2 of (ImgA; ImgP; ImgN). As yet another example, a deep neural network layer can receive the outputs of a number of deep neural network layers as its input.

The input of a deep neural network layer can be different in different implementations. For example, the input of a deep neural network layer can include the outputs of five deep neural network layers. As another example, the input of a deep neural network layer can include 1% of the deep neural network layers of the deep neural network 112. The output of a deep neural network layer can be the inputs of a number of deep neural layers. For example, the output of a deep neural network layer can be used as the inputs of five deep neural network layers. As another example, the output of a deep neural network layer can be used as the inputs of 1% of the deep neural network layers of the deep neural network layer.

The input size or the output size of a deep neural network layer can be quite large. The input size or the output size of a deep neural network layer can be n×m, where n denotes the width and m denotes the height of the input or the output. For example, n or m can be 21. The channel sizes of the input or the output of a deep neural network layer can be different in different implementations. For example, the channel size of the input or the output of a deep neural network layer can be 32. The kernel size of a deep neural network layer can be different in different implementations. For example, the kernel size can be n×m, where n denotes the width and m denotes the height of the kernel. For example, n or m can be 5. The stride size of a deep neural network layer can be different in different implementations. For example, the stride size of a deep neural network layer can be 3.

Example Deep Network Architecture

FIG. 3 shows a table illustrating an example deep network architecture. The DNN 112 can implement the deep network architecture shown in FIG. 3. The DNN 112 can include a local contrast normalization layer 302 receiving eye images, for example iris images, as its input. The local contrast normalization layer 302 can normalize a plurality of eye images with respect to one another at once. The input size of the local contrast normalization layer 302 can be 208×208× 1, representing the width, the height, and the channel size of the input. The kernel size and the stride of the local contrast normalization layer 302 can be 9×9 and 1 respectively.

The output of the local contrast normalization layer 302 can be connected to three consecutive combinations of convolutional layers 304a, 304b, or 304c, ReLU layers 306a, 306b, or 306c, or maximum pooling layers 308a, 308b, or 308c. The input size of the convolutional layers 304a, 304b, or 304c can be 200×200×1, 98×98 x16, or 47×47×32 respectively. The kernel size and the stride of the convolutional layers 304a, 304b, or 304c can be 5×5 and 1 respectively. The input size of the maximum pooling layers 308a, 308b, or 308c can be 196×196×16, 94×94×32, or 43×43×64 respectively. The kernel size and the stride of the maximum pooling layers 308a, 308b, or 308c can be 2×2 and 2 respectively.

An inception-like layer 310 can follow the three consecutive convolutional layers 304a, 304b, or 304c, ReLU layers 306a, 306b, or 306c, or maximum pooling layers 308a, 308b, or 308c. The inception-like layer 310 can be as illustrated in FIG. 2. The input size of the inception-like layer 310 can be 21×21×64. The inception-like layer 310 can include 1×1, 3×3, and 5×5 convolutional layers with dimension reduction illustrated in FIG. 2.

Referring to FIG. 3, the inception-like layer 310 can be followed by a ReLU layer 312 with input size 21×21×64. The input size of the ReLU layer 312 can be 21×21×64. A combination of a convolutional layer 314 and a softsign layer 316 can follow the ReLU layer 312. The input size of the convolutional layer 314 can be 21×21×64. The kernel size and the stride of the convolutional layer 314 can be 1×1 and 1 respectively. A L2 normalization layer 318 can normalize its input with size 21×21×1 to generate its output with size 21×21×1. Thus, the embedding 108 learned by the deep neural network 112 shown in FIG. 3 can map eye images from the eye image space of 208×208 dimensions into embedding space representations with 432 dimensions in the embedding space.

Example Eye Images and Segmented Iris Images

The eye authentication trainer 104 can training a deep neural network (DNN) 112 to learn the embedding 108 from a training set T1 that includes pairs of eye image and label (Img; Label), where the Img denotes an image of a user's eye, and the Label enables the identity of the user to be distinguished from the identities of other users. In some implementations, the training set T1 can include triplets of (ImgL; ImgR; Label), where the ImgL denotes an image of a user's left eye, the ImgR denotes an image of the user's right eye, and the Label enables the identity of the user to be distinguished from the identities of other users. From the training set T1 of (Img; Label) pairs or (ImgL; ImgR; Label) triplets, the eye authentication trainer 104 can compute a triplet training set T2 including triplets of (ImgA; ImgP; ImgN), where the ImgA 116a and the ImgP 116p are eye images of a person (or images of a person's left eye or right eye), and ImgN 116n is an eye image of another person (or an image of the same person's other eye). The eye images can be images of different parts of the eye. For example, the eye images 110 can include images of the periocular region of the eye. As another example, the eye images 110 can include segmented iris images. The eye authentication trainer 104 can convert the eye images 110 into polar coordinates to generate polar eye images for learning the embedding 108.

The eye images 110 received by the eye authentication trainer 104 can include both the iris portion and the periocular region of the eye. In some embodiments, the eye authentication trainer 104 can train a deep neural network 112 using the eye images to learn the important features in the eye images, for example the iris features or non-iris features, without first segmenting the periocular images. Thus, the DNN 112 can learn that the data in the iris is of particularly high value, but it can also make use of the periocular portions of the image if doing so aids in iris feature identification. The periocular region includes the eye and portions around the eye such as, e.g., eyelids, eyebrows, eyelashes, and skin surrounding the eye (which may have unique texture). For example, the particular structure of a person's tear ducts may provide identifying information. Accordingly, analysis of the periocular region by the DNN may provide a more robust biometric signature (via the embedding) than analysis of just the iris alone.

The eye authentication trainer 104 can optionally include an iris extractor. The iris extractor can segment an eye image to extract the iris portion of an eye image to generate a segmented iris image or extract another portion of an eye image, such as the sclera portion surrounding the iris, to generate a segmented eye image). The eye authentication trainer 104 can train the deep neural network 112 using the segmented iris images. The iris extractor can be different in different implementations. For example, the iris extractor can be implemented using a deep neural network. The deep neural network can have the architecture illustrated in FIG. 1, 2, or 3. As another example, the iris extractor can utilize other known iris segmentation techniques, such as techniques based on integro-differential operator (e.g., Daugman's method), Hough transform, geodesic active contours, active contours without edges, directional ray detection method, Wilde's method, Camus and Wildes' method, Martin-Roche method, or any combination thereof.

In some implementations, computer vision techniques can be used to perform iris segmentations. A computer vision module can implement one or more computer vision techniques. Non-limiting examples of computer vision techniques include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

An eye image can be a composite image created using multiple eye images of the same person. The multiple eye images of the same person can be, for example, captured close in time as multiple frames of a video. In some embodiments, some of the eye images in the training set T1 of (Img; Label) pairs are extracted from multiple frames of a video. The eye images of a person can include a time series of the person's eye images.

The size of the training set T1 can be quite large. For example, the training set T1 can include $10^6$ (Img; Label) pairs. The training set T1 can include the eye images of a number of persons in different implementations. For example, the training set T can include the eye images of 1,000 persons. For each person, the number of eye images in the training set T1 can be different in different implementations. For example, for each person, the number of eye images in the training set T can be 1,000. The size of the triplet training set T2 can be quite large. For example, the triplet training set T2 can include $10^6$ (ImgA; ImgP; ImgN) triplets. The triplet training set T2 can include the eye images of a number of persons in different implementations. For example, the triplet training set T2 can include the eye images of 1,000 persons. For each person, the number of eye images in the triplet training set T2 can be different in different implementations. For example, for each person, the number of eye images in the triplet training set T2 can be 1,000.

Example Combination with Other Biometric Information

The eye authentication trainer 104 can utilize other biometric identification information to train a deep neural network (DNN) 112. For example, in addition to utilizing a training set T1 of (Img; Label) pairs to train the DNN 112, the eye authentication trainer 104 can train the DNN 112 with other biometric information at the same time or sequentially. Non-limiting examples of other biometric information include skin tone, skin texture, fingerprints, or voice. In some implementations, biometric information can include time-series of biometric information. From the eye images and other biometric information, the eye authentication trainer 104 can learn an embedding 108 that can map a combination of an eye image and other biometric information into a co-embedding space. An eye authenticator 104 of a user device can authenticate users based on co-embedding the eye image and the other biometric information into the co-embedding space.

In some implementations, other biometric information may not be co-embedded into a co-embedding space with the eye image. For example, a user device can authenticate a user based on the representations of the eye images in an embedding space and representations of other biometric information in another embedding space. As another example, a user device can authenticate a user based, in part, on the representations of the eye images in the eye image space or other biometric information in the native space of other biometric information. In some embodiments, a user device can authenticate a user based on one or more embedding spaces and one or more co-embedding spaces. The co-embedding space can co-embed two or more types of biometric information. For example, a user device can authenticate a user based on an embedding space for eye images and a co-embedding space for biometric information (e.g., a co-embedding space for eye images). As another example, the co-embedding space can embed eye images of a user's left eye and eye images of the user's right eyes. Co-embedding may advantageously result in better quality (e.g., higher true positive rate, higher true negative rate, lower equal error rate, or any combination thereof).

Example Learning an Embedding Network

A deep neural network 112 was trained to learn an embedding 108 using stochastic gradient descent with Nesterov momentum. The deep neural network 112 had the triplet network architecture illustrated in FIG. 1, including an anchor embedding network (ENetworkA) 124a, a positive embedding network (ENetworkP) 124P, and a negative embedding network (ENetworkN) 124n. The embedding 108, the ENetworkA 124a, the ENetworkP 124P, and the ENetworkN 124n had the network architecture illustrated in FIGS. 2-3. At each iteration during the learning of the embedding 108, a mini-batch of random triplets of segmented iris images (ImgA; ImgP; ImgN) with batch size of 64 were generated.

The deep neural network (DNN) 112 was trained with difficult triplets. Using all possible random (ImgA; ImgP; ImgN) triplets to train the deep neural network 112 may result in many triplets that can easily satisfy the constraint in Equations 1.1, 1.2, 2.1, or 2.2. These triplets may not contribute substantially to the training of the deep neural network 112 and may result in slower convergence. The deep neural network 112 was trained with difficult triplets that contributed to the learning of the embedding 108.

The following procedure was used to select difficult triplets. No more than half of a mini-batch of random triplets included difficult triplets. Two different subjects, S1 and S2, were selected. The ImgA 116a was randomly sampled from the segmented iris images of the subject S1. Candidates for the ImgP 116p and the ImgN 116n were randomly sampled 100 times from the iris images of the subject S1 and the iris images of the subject S2 respectively. A triplet (ImgA; ImgP; ImgN) was selected for the mini-batch if its corresponding triplet (EmbA; EmbP; EmbN) resulted in the largest value in Equation 1.1 and |EmbA−EmbP|<|EmbA−EmbN|. This selection procedure may advantageously select difficult triplets for learning the embedding 108, resulting in improved learning speed. The resulting embedding 108 may advantageously have better quality (e.g., higher true positive rate, higher true negative rate, lower equal error rate, or a combination thereof) compared to if only random triplets were used during the learning of the embedding 108.

The remaining triplets in the mini-batch of random triplets were randomly selected. The three identical embedding networks ENetworkA 124a, the ENetworkP 124p, or the ENetworkN 124n were recomputed once every 1,000 iterations during training and were used for mapping and ranking the triplets (ImgA; ImgP; ImgN). Recomputing the three identical embedding networks ENetworkA 124a, the ENetworkP 124p, or the ENetworkN 124n once every 1,000 iterations may advantageously save the time of generating mini-batch of random triplets.

Figures 4A, 4B:
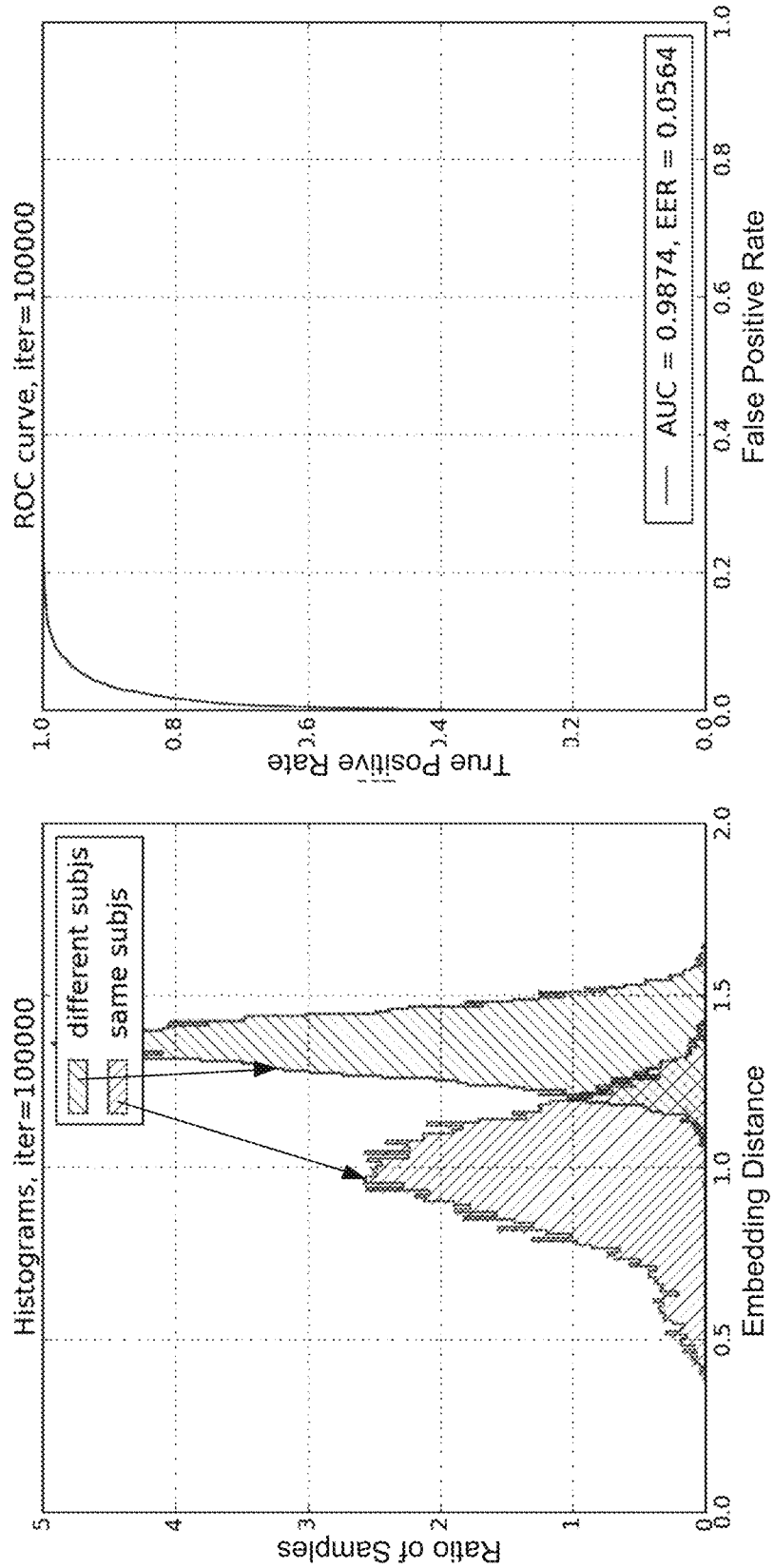
FIGS. 4A and 4B show example results of learning an embedding using a deep neural network with the deep network architecture illustrated in FIGS. 1-3 after 100,000 iterations.

FIGS. 4A and 4B show example results of learning an embedding 108 using a deep neural network 112 with the deep network architecture illustrated in FIGS. 1-3 after 100,000 iterations. FIG. 4A is a histogram plot of the ratio of samples vs. embedding distance, showing the distance in the embedding space between eye images of the same subjects and different subjects. The iris images of the same subjects were closer together in the embedding space, and the iris images of different subjects were further away from one another in the embedding space.

FIG. 4B is a receiver operating characteristic (ROC) curve of true positive rate (TPR) vs. false positive rate (FPR). The area under curve (AUC) is 98.74%. The equal error rate (EER) metric can show pairwise verification quality on a test set of iris images. The test set of random triplets was generated using subjects different from the subjects used for generating the triplet training set T2 of random triplets. On the test set with local contrast normalization, 5.6% EER was achieved. Without local contrast normalization 6.8% EER was achieved. With local response normalization, 5.3% EER was achieved.

Using iris images converted into polar coordinates to train the deep neural network 112, 3.6% EER was achieved. This result can be improved using groups of frames for computing one embedding space representation. One approach can use a number of iris polar images as n-channel inputs of the deep neural network 112, for example six iris images as 6-channel inputs. Utilizing n-channel inputs may allow the deep neural network 112 to perform signal fusion.

Another approach can utilize a recurrent layer in the deep neural network 112, for example the recurrent layer can be situated closer to the input layer of the DNN 112, in the interior of the DNN 112, or can be situated closer to the output layer of the DNN 112. A recurrent layer may allow the deep neural network 112 to perform embedding fusion. The deep neural network 112 can implement the Long Short Term Memory (LSTM) architecture, an artificial neural network that contains LSTM blocks. A LSTM block can remember a value for an arbitrary length of time. A LSTM block can determine when the input is significant enough to remember, when it should continue to remember or forget the value, and when it should output the value.

Another approach can combine an n-channel inputs and a recurrent layer. The n-channel deep neural network may give the best accuracy. The Long Short Term Memory (LSTM) architecture may improve accuracy only in combination with the n-channel deep neural network. For example, 8-channel LSTM-deep neural network that computed one embedding space representation per 64 polar images gave equal error rate (EER) of 2.9%.

FIGS. 5A and 5B show example results of learning an embedding 108 using a deep neural network 112 with the deep network architecture illustrated in FIGS. 1-3 after 50,000 iterations. The deep neural network 112 was trained using groups of six successive polar images as 6-channel inputs. FIG. 5A is a histogram plot of the probability density vs. embedding distance, showing the distance in the embedding space between pairs of groups of polar images of the same subjects and different subjects. FIG. 5B is a receiver characteristic (ROC) curve of true positive rate (TPR) vs. false positive rate (FPR). On the test set 2.14% EER was achieved with 6-channel inputs. In contrast, the combination of the iris code with the Hamming distance gave 8% EER using polar iris images, iris images converted into polar coordinates.

Example User Device

Figure 6:
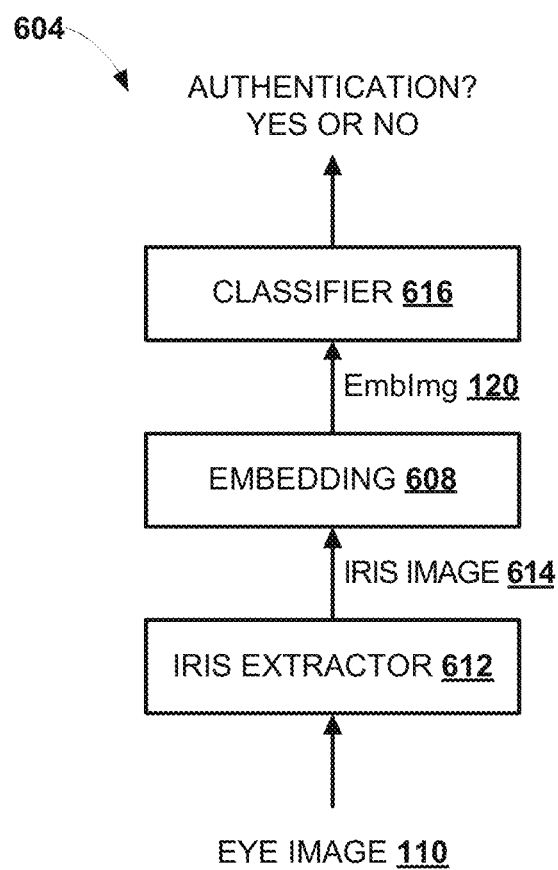
FIG. 6 is a block diagram of an example eye authenticator of a user device.

FIG. 6 is a block diagram of an example eye authenticator 604 of a user device. The eye authenticator 604 can be configured to determine whether a user is an authorized user. The user device can include an image sensor (e.g., a digital camera) configured to capture eye images. To authenticate a user, the image sensor can capture an eye image 110 of the user. From the eye image of the user, the eye authenticator 604 can determine whether the user is an authorized user using an embedding 608. The embedding 608 can map an eye image 110 into an embedding space representation in an embedding space.

The embedding 608 can be the same as the embedding 108 learned by the eye authentication trainer 104, or the embedding 608 can be the similar to the embedding 108 learned by the eye authentication trainer 104 (e.g., the embedding 608 can have weight values of the embedding 108 quantized). The architecture of the embedding 608 can be the same as the architecture of the embedding 108, or the architecture of the embedding 608 can be similar to the architecture of the embedding 108.

In some embodiments, the embedding 608 can be trained using eye images without iris segmentations (or some eye images and some iris images), while during authentication the embedding 608 computes an embedding space representation of the user's eye image. In some embodiments, the embedding 608 can be trained using iris images, while during authentication the embedding 608 computes an embedding space representation of the user's iris image. Such embodiments may advantageously save computations during authentication.

The input of the embedding 608 can be different in different implementations. For example, the input of the embedding 608 can be an eye image 110. As another example, the input of the embedding 608 can be a segmented iris image. The eye authenticator 604 can optionally include an iris extractor 612 for segmenting eye images to extract the iris portions of the eye images to generate segmented iris images 614. As yet another example, the input of the embedding 608 can be the same as the input of the embedding 108.

From the user's eye image 110 (or segmented iris image 614), the embedding 608 can compute an embedding space representation of the user's eye image (EmbImg) 120. The embedding space representation of the user's eye image 120 can be an n-dimensional representation of the user's eye image 110 in an embedding space. The classifier 616 can calculate a likelihood score of whether the user is an authorized user based on the embedding space representation 120. Based on the likelihood score, the classifier 616 can determine whether the user is an authorized user (e.g., based on the threshold 132 value).

The likelihood score can be calculated differently in different implementations. For example, the classifier 616 can compare EmbImg 120 with the embedding space representation of an eye image of the authorized user to calculate the likelihood score. As another example, the classifier 616 can compare the EmbImg 120 with the embedding space representations of two or more eye images of the authorized user to calculate the likelihood score. If the distance between the EmbImg 120 and the authorized user's one or more eye images is within a threshold value, for example the threshold value 132 determined by the eye authentication trainer 104, the classifier 616 can indicate to the user device that the user's eye image is similar enough to the authorized user's eye image in the embedding space such that the user should be authenticated as the authorized user. The distance between the representations of two eye images in the embedding space can be, for example, a Euclidian distance (such as an L2 norm) or a non-Euclidean distance (e.g., a hyperbolic space) between the two representations. The user device can authenticate the user and grant or deny access to the user based on the classifier's determination. In some implementations, the threshold value can be larger (or smaller) if the embedding 608 is trained using eye images with (or without) iris segmentations (or some eye images and some iris images), while during authentication the embedding 608 computes an embedding space representation of the user's eye image (or iris image). Such implementations may advantageously save computations during authentication.

The classifier 616 can be one of many types of classifiers. For example, the classifier 616 can be a binary classifier such as a logistic regression classifier, a support vector machine classifier, a Bayesian classifier, or a softmax classifier. For example, the classifier 616 can be a multiclass or multilabel classifier, such as a multiclass logistic regression classifier, a multiclass support vector machine classifier, or a Bayesian classifier.

Example Process for Eye Authentication

Figure 7:
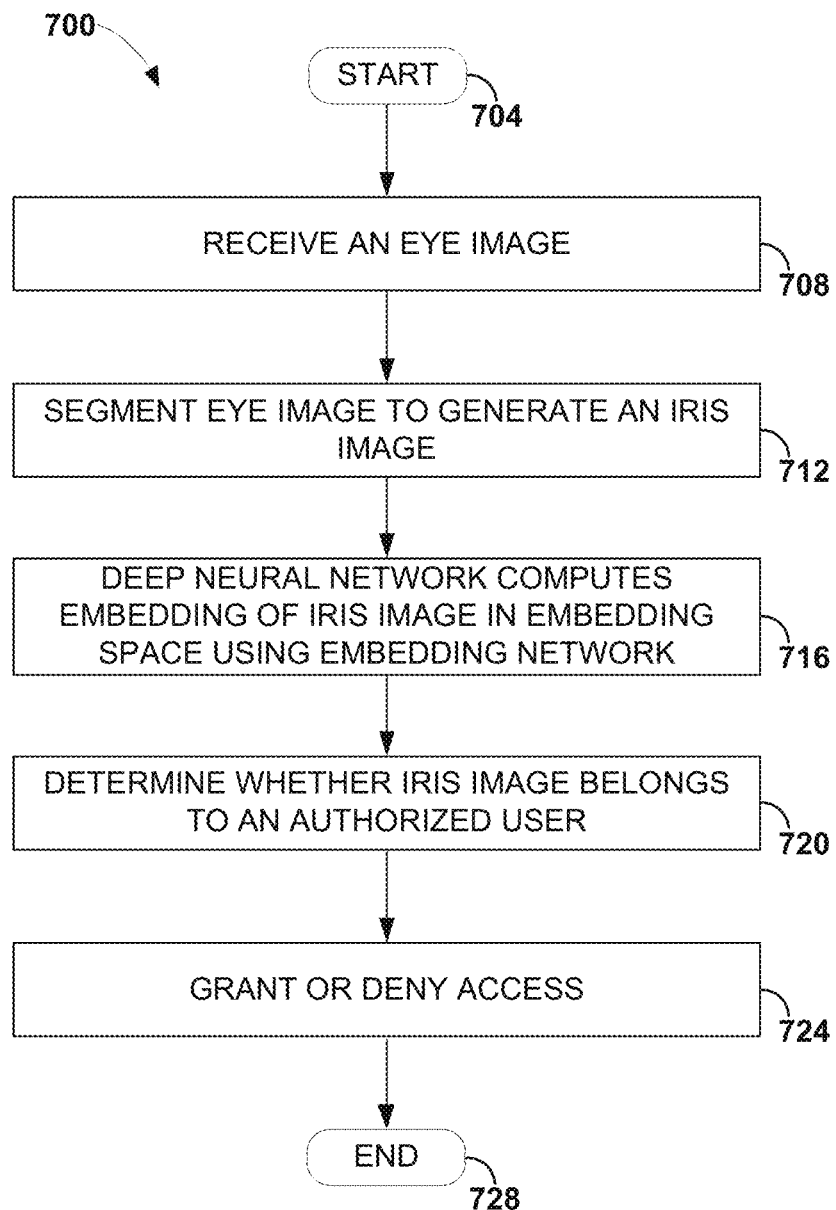
FIG. 7 is a flow diagram of an example process for eye authentication.

FIG. 7 is a flow diagram of an example process 700 for eye authentication. The eye authenticator 604 can implement the example process 700 for eye authentication. The process 700 starts at block 704. At block 708, a user's eye image is received. For example, an image sensor (e.g., a digital camera) of the user device can capture the user's eye image. After receiving the user's eye image at block 708, the user's eye image can be optionally segmented to generate an iris image by, for example, the iris extractor 612 of the user device, at block 712. At block 716, the embedding 608 of the eye authenticator 604 can compute an embedding space representation of the user's iris image (or eye image). In some embodiments, the embedding 608 can be trained using eye images without iris segmentations (or some eye images and some iris images), while during authentication the embedding 608 computes an embedding space representation of the user's eye image. In some embodiments, the embedding 608 can be trained using iris images, while during authentication the embedding 608 computes an embedding space representation of the user's iris image. Such embodiments may advantageously save computations during authentication.

Based on the embedding space representation of the user's iris image, the classifier 616 of the eye authenticator 604, for example, can determine whether the user is an authorized user at block 720. For example, the classifier 616 can compare the embedding space representation of the user's iris image with one or more embedding space representations of one or more iris images of the authorized user. If the distance between the embedding space representations of the user's iris image and the authorized user's one or more iris images is within a threshold value, for example the threshold value 132 determined by the eye authentication trainer 104, the classifier 616 of the eye authenticator 604 can indicate to the user device that the user's iris image is similar enough to the authorized user's iris image in the embedding space such that the user should be authenticated as the authorized user. At block 728, the user device can grant or deny the user's access based on, for example, the classifier's determination at block 720. The process 700 ends at block 728.

Example Eye Authentication System

Figure 8:
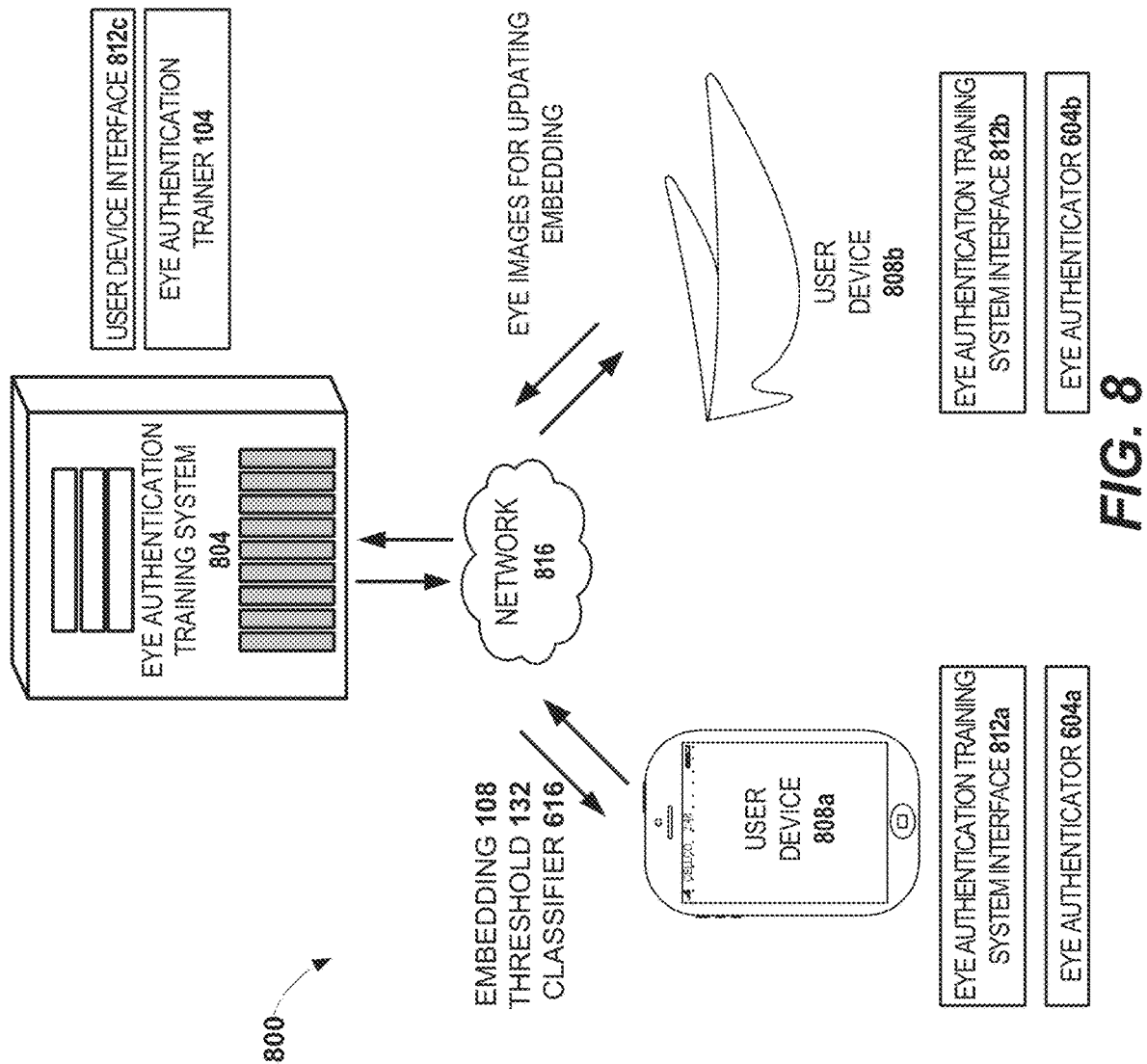
FIG. 8 schematically illustrates an example of an eye authentication system.

FIG. 8 schematically illustrates an example of an eye authentication system 800. The eye authentication system 800 can include an eye authentication training system 804, and one or more user devices operated by one or more authorized users. For example, a first authorized user can operate a first user device 808a, and a second authorized user can operate a second user device 808b. The eye authentication training system 804 or the user device 808a or 808b can implement the systems, components, or techniques described above as computer programs on one or more computers at one or more locations.

The eye authentication training system 804 can provide the user device 808a or 808b with an embedding 108 that can map an eye image from the eye image space into an embedding space representation for eye authentication. The embedding 108 provided by the eye authentication training system 804 to the user device 808a or 808b can map an iris image (which may be segmented from an image of the periocular region) from the iris image space into an embedding space representation for iris authentication. The eye authentication training system 804 can also provide the user device 808a or 808b with a threshold value 132 in the embedding space and/or a classifier 616 that can be used in determining whether a user's eye image is similar enough to an authorized user's eye image in the embedding space such that the user should be authenticated as the authorized user. The user device 802a or 802b can receive the embedding 108 (or a part of the embedding 108), the threshold 132 (or a part of the threshold 132), and/or the classifier 616 (or a part of the classifier 616) directly from the eye authentication training system 804, or indirectly from the eye authentication training system 804 via another computing system.

The eye authentication training system 804 can be implemented on hardware computing devices that include desktop computers, server computers, or cloud computing systems. Non-limiting examples of the user device 808a or 808b include desktop computers, server computers, cloud computing systems, or mobile computing devices such as mobile phones, tablet computers, e-readers, smart watches, or wearable display systems (see, e.g., the head mounted display 900 described with reference to FIG. 9).

To facilitate communication between the user device 808a or 808b and the eye authentication training system 804, the user device 808a or 808b can include an eye authentication training system interface 812a or 812b, and the eye authentication training system 804 can include a user device interface 812c. The eye authentication training system interface 812a or 812b can communicate with the user device interface 812c using a network interface. The user interface 812c can communicate with the eye authentication training system interface 812a or 812b using a network interface either synchronously or asynchronously. Non-limiting example protocols used by the authentication training system interface 812a or 812b or the user interface 812c to communicate with one another include transmission control protocol (TCP), user datagram protocol (UDP), or hypertext transfer protocol (HTTP). The user interface 812c can be implemented as a web server. The authentication training system interface 812a or 812b can be implemented as a web client.

The user device 808a or 808b can include one or more sensors for capturing the user's biometric information. For example, the user device 808a or 808b can include one image sensor (e.g., a digital camera) for capturing eye images of users, including eye images of authorized users. As another example, the user device 808a or 808b can include one or more sensors for capturing other biometric information, such as skin tone, skin texture, fingerprints, or voice.

To authenticate a user, the user device 808a or 808b can capture an eye image of the user using an image sensor. The eye image can include the periocular region of the eye. The eye can be imaged using visible or infrared light. After capturing the eye image, an eye authenticator 604a or 604b of the user device 808a or 808b can map the eye image from the eye image space into an embedding space representation, an n-element representation of the eye image in the embedding space, using the embedding 108. In some embodiments, after capturing the eye image, the eye authenticator 604a or 604b of the user device 808a or 808b can optionally segment the eye image to extract the iris portion of the eye image and generate a segmented iris image of the user. After generating the iris image of the user, the eye authenticator 604a or 604b of the user device 808a or 808b can map the iris image from the iris image space into a representation of the iris image in the embedding space using the embedding 108.

To authenticate a user, the eye authenticator 604a or 604b can determine the distance between the embedding space representation of the captured eye image in the embedding space and the embedding space representations of an authorized user' one or more eye images in the embedding space. If the distance between the embedding space representations of the user's eye image and an authorized user's eye image is within the threshold value 128, the eye authenticator 604a or 604b can consider the user's eye image to be similar enough to the authorized user's eye image such that the user should be authenticated as the authorized user. The user device 808a or 808b can grant or deny the user access to the user device 808a or 808b based on whether the eye authenticator 604a or 604b can authenticate the user as an authorized user. The distance between two embedding space representations can be, for example, an Euclidian distance (such as an L2 norm) or a non-Euclidian distance (e.g., a hyperbolic space) between the two embedding space representations.

The computations performed by the eye authenticator 604a or 604b can be distributed across components of the user device 808a or 808b or components associated with or in communication with the user device 808a or 808b. In some embodiments, the user device 808a or 808b can include a local processing module and a local data repository (e.g., the local processing and data module 924 illustrated in FIG. 9). The user device 808a or 808b can be in communication with, or include, a remote processing module (e.g., the remote processing module 928 in FIG. 9) and/or a remote data repository (e.g., the remote data repository 932 in FIG. 9). The user device 808a or 808b can store the entire (or part of) the embedding 108 and/or the entire (or part of) classifier 616. To authenticate a user, the user device 808a or 808b can capture an eye image of the user using an image sensor. After capturing the eye image, an eye authenticator 604a or 604b of the user device 808a or 808b can map the eye image from the eye image space into an embedding space representation using the embedding 108.

The local processing module and/or the remote processing module of the user device 808a or 808b can be used by the eye authenticator 604a or 604b to map the eye image from the eye image space into an embedding space representation using the embedding 108. For example, the embedding 108 can be stored in the remote data repository, and the remote processing module can map the eye image from the eye image space into an embedding space representation using the embedding 108. As another example, the embedding 108 (or parts of the embedding 108) can be stored in both the local data repository and the remote data repository, and the local processing module and the remote processing module can together map the eye image from the eye image space into an embedding space representation using the embedding 108. The local processing module and the remote processing module can each perform part of the mapping process or computation. As yet another example, the mapping from the eye image into an embedding space representation can be distributed across the local processing module and the remote processing module. The distribution of the mapping process can be predetermined or determined based on the workload of the local processing module and/or the remote processing module. Alternatively or in addition, the distribution of the mapping process can be based on the energy (e.g., battery power) available to the local processing module and/or the remote processing module.

In some embodiments, the user device 808a or 808b (e.g., using the local processing module and/or the remote processing module) and/or another computing system (e.g., a computing system on the cloud or a companion computing system of the user device 808a or 808b) can be used by the eye authenticator 604a or 604b to map the eye image from the eye image space into an embedding space representation using the embedding 108. The computing system can store and use the entire (or part of) the embedding 108 and/or the entire (or part of) classifier 616. For example, the user device 808a or 808b can transmit the eye image to the other computing system. After mapping the eye image into an embedding space representation, the computing system can transmit the embedding space representation back to the user device 808a or 808b. As another example, the mapping from the eye image into an embedding space representation can be distributed across the user device 808a or 808b and the computing system. The distribution of the mapping process can be determined based on the workload of the user device 808a or 808b and/or the computing system. Alternatively or in addition, the distribution of the mapping process can be based on the energy (e.g., battery power) available to the user device 808a or 808b, the battery power remaining of the user device 808a or 808b, and/or the computing system.

Whether the mapping process is performed by the user device 808a or 808b, the local processing module, the remote processing module, and/or the other computing system, the user device 808a or 808b, the local processing module, the remote processing module, and/or the computing system can be used by the eye authenticator 604a or 604b to determine the distance between the embedding space representation of the captured eye image in the embedding space and the embedding space representations of an authorized user' one or more eye images in the embedding space. For example, the user device 808a or 808b can perform the mapping process (or part of the mapping process) to generate an embedding space representation of an eye image and transmit the embedding space representation to the computing system. The computing system in turn can determine the distance between the embedding space representation of the captured eye image in the embedding space and the embedding space representations of an authorized user' one or more eye images in the embedding space. The computing system can transmit the distance to the user device 808a or 808b, which in turn can authenticate the user based on the distance, or the computing system can determine whether the user device 808a or 808b should authenticate the user and transmit the determination to the user device 808a or 808b. As another example, the computing system can perform the mapping process (or part of the mapping process) to generate an embedding space representation of an eye image. The computing system can transmit, to the user device 808a or 808b the embedding space representation, the distance between the embedding space representation of the captured eye image and the embedding space representations of an authorized user' one or more eye images in the embedding space, and/or determination of whether the user device 808a or 808b should authenticate the user. The user device 808a or 808b can authenticate the user using the embedding space representation, the distance, or the authentication determination received.

The transmission or communication between the user device 808a or 808b, the local processing module, the local data repository, the remote processing module, the remote data repository, and/or the other computing system may or may not be encrypted. For example, the transmission between the user device 808a or 808b and the computing system may be encrypted. As another example, the transmission between the local processing module and the remote processing module may not be encrypted.

After the eye authenticator 604a or 604b authenticates a user as an authorized user, the eye authenticator 604a or 604b can provide the eye image used for authenticating the user to an eye authentication trainer 104 via the user device interface 812c or the eye authentication training system interface 812a or 812b. From the eye images of authenticated users provided by the eye authenticator 604a or 604b, the eye authentication trainer 104 can compute, at regular intervals, one or more of: an updated embedding 108; or an updated threshold value 128. The eye authentication training system 804 can provide the updated embedding 108, the updated threshold value 128 in the updated embedding space, and/or the updated classifier 616 to the user device 808a or 808b via the user device interface 812c or the eye authentication training system interface 812a or 812b. The transmission of the updated embedding 108, the updated threshold value 128 in the updated embedding space, and/or the updated classifier 616 from the eye authentication training system 804 to the user device 808a or 808b may or may not be encrypted.

The regular intervals can be time-based. For example, the regular intervals can be once every hour, day, or month. The regular intervals can be based on the number of successful authentications by the user device 808a or 808b. For example, the regular intervals can be once every 1,000 successful authentications. The regular intervals can be based on the number of authenticated eye images provided by the eye authenticator 604a or 604b to the eye authentication trainer 104. For example, the regular intervals can be once every 1,000 authenticated eye images provided by the eye authenticator 604a or 604b to the eye authentication trainer 104.

The user device 808a or 808b or the eye authentication training system 804 can include a hardware processor for executing instructions stored in a memory, for example a random access memory (RAM), for storing instructions and data when the user devices 808a or 808b or the eye authentication training system 804 is powered on. The memory can include read only, non-volatile, writable, or volatile memory. The user device 808a or 808b or the eye authentication training system 804 can include a storage for storing instructions or data when the user device 808a or 808b or the eye authentication training system 804 is powered on or powered off. One or both of the memory or the storage can store the embedding 108 or the threshold value 128.

The user device 808a or 808b or the eye authentication training system 804 each can include a network interface for communicating with other devices on a data communication network 816 or the cloud. Non-limiting examples of the network interface include wired communication, wireless communication, cellular communication, or communications using Bluetooth®, radio frequency (RF), or infrared (IR). Non-limiting examples of the data communication network 826 include local area network (LAN), wide area network (WAN), or the Internet.

Example Wearable Display System

The user device 808a or 808b can be or can be included in a wearable display device, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 9:
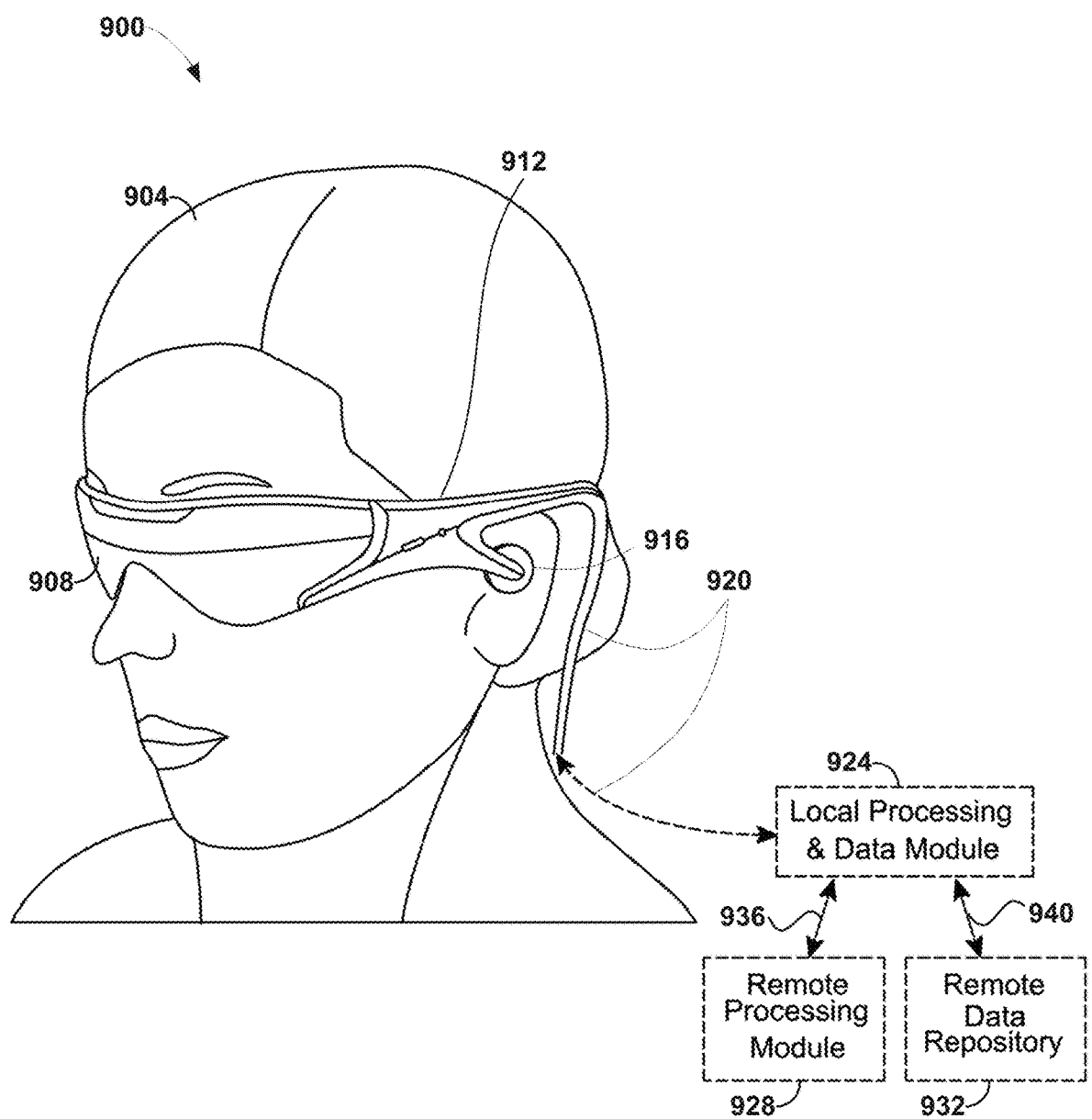
FIG. 9 schematically illustrates an example of a wearable display system.

FIG. 9 illustrates an example of a wearable display system 900 that can be used to present an AR, VR, or MR experience to the wearer. The wearable display system 900 may be programmed to perform an eye authenticator 604 to provide any of the applications or embodiments described herein. The display system 900 includes a display 908, and various mechanical and electronic modules and systems to support the functioning of that display 908. The display 908 may be coupled to a frame 912, which is wearable by a display system wearer or viewer 904 and which is configured to position the display 908 in front of the eyes of the wearer 904. The display 908 may be a light field display. In some embodiments, a speaker 916 is coupled to the frame 912 and positioned adjacent the ear canal of the user in some embodiments, another speaker, not shown, is positioned adjacent the other ear canal of the user to provide for stereo/shapeable sound control. The display 908 is operatively coupled 920, such as by a wired lead or wireless connectivity, to a local data processing module 924 which may be mounted in a variety of configurations, such as fixedly attached to the frame 912, fixedly attached to a helmet or hat worn by the user, embedded in headphones, or otherwise removably attached to the user 904 (e.g., in a backpack-style configuration, in a belt-coupling style configuration).

The local processing and data module 924 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 912 or otherwise attached to the wearer 904), such as image capture devices (such as cameras), microphones, inertial measurement units, accelerometers, compasses, GPS units, radio devices, and/or gyros; and/or (b) acquired and/or processed using remote processing module 928 and/or remote data repository 932, possibly for passage to the display 908 after such processing or retrieval. The local processing and data module 924 may be operatively coupled by communication links 936, 940, such as via a wired or wireless communication links, to the remote processing module 928 and remote data repository 932 such that these remote modules 928, 932 are operatively coupled to each other and available as resources to the local processing and data module 924. The remote processing module 928 and/or remote data repository 932 can be part of the head mounted display 900, part of a companion device of the head mounted display 900, on the same network as the local processing & data module 924, and/or on the cloud.

In some embodiments, the remote processing module 928 may comprise one or more processors configured to analyze and process data and/or image information such as video information captured by an image capture device. The video data may be stored locally in the local processing and data module 924 and/or in the remote data repository 932. In some embodiments, the remote data repository 932 may comprise a digital data storage facility, which may be available through the internet or other networking configuration in a "cloud" resource configuration. In some embodiments, all data is stored and all computations are performed in the local processing and data module 924, allowing fully autonomous use from a remote module.

In some implementations, the local processing and data module 924 and/or the remote processing module 928 are programmed to perform embodiments of eye authenticator 604 disclosed herein. The image capture device can capture eye images and iris images for a particular application (e.g., eye images and iris images of the wearer's eye for an authentication application or eye images and iris images of the eye of a person other than the wearer for an identification application). The eye images and the iris images can be analyzed using the eye authenticator 604 by one or both of the processing modules 924, 928. In some cases, off-loading at least some of the eye authenticator 604 analysis to a remote processing module (e.g., in the "cloud") may improve efficiency or speed of the computations. The parameters of the eye authenticator 604 (e.g., subsampling factors for pooling layers, the input size, the number, the kernel size, and the stride of various layers, etc.) can be stored in data modules 924 and/or 928.

The results of the image analysis (e.g., the output of the eye authentication trainer 104) can be used by one or both of the processing modules 924, 928 for additional operations or processing. For example, in various applications, biometric identification, eye-tracking, recognition or classification of gestures, objects, poses, etc. may be used by the wearable display system 900. For example, the eye authentication trainer 104 may analyze eye images or iris images captured of the wearer 904 and authenticate the wearer 904, and the system 900 may perform an appropriate action in response to the wearer's authentication (e.g., displaying the wearer's 904 new emails). As another example, the processing modules 924, 928 that perform the eye authenticator 604 may analyze eye images or iris images of people in the wearer's surroundings to identify the people in the wearer's surroundings. The processing modules 924, 928 of the wearable display system 900 can be programmed with one or more suitable eye authentication trainer 104 to perform any of the video or image processing applications described herein.

Additional Aspects

In a first aspect, a method for iris authentication is disclosed. The method is performed under control of a hardware processor and comprises receiving a first image of an eye; processing the first image of the eye using a deep neural network to generate an embedding space representation; and processing the embedding space representation using a classifier to calculate a likelihood score that the first image of the eye is an image of an eye of an authorized user.

In a second aspect, the method of aspect 1, wherein the deep neural network comprises a plurality of layers, and wherein the plurality of layers comprises a pooling layer, a brightness normalization layer, a convolutional layer, an inception-like layer, a rectified linear layer, a softsign layer, or any combination thereof.

In a third aspect, the method of aspect 2, wherein the brightness normalization layer is a local contrast normalization layer or a local response normalization layer.

In a fourth aspect, the method of any one of aspects 1-3, wherein the deep neural network comprises a triplet network.

In a fifth aspect, the method of aspect 4, wherein the triplet network is configured to learn the deep neural network from eye images of a plurality of persons, and wherein a distance in the embedding space representation for eye images from the same person is smaller than a distance in the embedding space representation for eye images from different persons.

In a sixth aspect, the method of any one of aspects 1-5, wherein the first image of the eye is received from a user, the method further comprises granting or denying the user access to a user device based on the likelihood score.

In a seventh aspect, the method of aspect 6, wherein the first image of the eye is captured by an image sensor of the user device.

In an eighth aspect, the method of any one of aspects 1-7, wherein the embedding space representation has unit length.

In a ninth aspect, the method of any one of aspects 1-8, wherein the classifier generates the likelihood score based on the Euclidian distance.

In a 10th aspect, the method of any one of aspects 1-9, wherein the classifier is a binary classifier, a logistic regression classifier, a support vector machine classifier, a Bayesian classifier, a softmax classifier, or any combination thereof.

In a 11th aspect, the method of any one of aspects 1-10, further comprising segmenting the first image of the eye to generate a second image of an iris of the eye, wherein processing the first image of the eye comprises processing the second image of the iris of the eye using the deep neural network to generate the embedding space representation.

In a 12th aspect, the method of any one of aspects 1-11, wherein the first image of the eye comprises mostly of the iris and the retina of the eye.

In a 13th aspect, the method of any one of aspects 1-12, wherein the first image of the eye comprises mostly of the retina of the eye.

In a 14th aspect, the method of any one of aspects 1-13, wherein the embedding space representation is n dimensional, and wherein the majority of the elements of the embedding space representation are statistically independent.

In a 15th aspect, a method for training an embedding network for iris authentication is disclosed. The method is performed under control of a hardware processor and comprises creating a deep neural network comprising a plurality of layers, wherein each of the plurality of layers is connected to at least another of the plurality of layers; providing the deep neural network with a training set comprising eye images of a plurality of persons; and computing embedding space representations of the plurality of eye images using the deep neural network, wherein the embedding space representations of the plurality of eye images of the same person are within a threshold.

In a 16th aspect, the method of aspect 15, wherein computing the embedding space representations of the plurality of eye images using the deep neural network comprises updating the deep neural network based on the distances between the embedding space representations of eye images of the same persons and different persons.

In a 17th aspect, the method of any one of aspects 15-16, wherein the plurality of layers comprises a pooling layer, a brightness normalization layer, a convolutional layer, an inception-like layer, a rectified linear layer, a softsign layer, or any combination thereof.

In a 18th aspect, the method of any one of aspects 15-17, wherein the deep neural network comprises a triplet network.

In a 19th aspect, the method of aspect 18, wherein the triplet network learns the deep neural network from the training set using triplets of eye images, where two eye images of the triplet are from the same person and the third eye image of the triplet is from a different person.

In a 20th aspect, a method for iris authentication of an authorized user is disclosed. The method is performed under control of a hardware processor and comprises receiving an image of an eye; processing the image of the eye to generate a representation of the image of the eye in polar coordinates; processing the representation of the image of the eye in polar coordinates using a deep neural network to generate an embedding space representation; and processing the embedding space representation using a classifier to generate a likelihood score that the image of the eye is an image of the authorized user's eye.

In a 21st aspect, a method for iris authentication of an authorized user is disclosed. The method is performed under control of a hardware processor and comprises receiving a first image of a first eye and a second image of a second eye; processing the first image of the first eye and the second image of the second eye using a deep neural network to generate a first embedding space representation of the first eye and a second embedding space representation of the second eye; and processing the first embedding space representation and the second embedding space representation using a classifier to generate a likelihood score that the first image of the first eye is an image of the authorized user's left eye and the second image of the second eye is an image of the authorized user's right eye.

In a 22nd aspect, a method for iris authentication of an authorized user is disclosed. The method is performed under control of a hardware processor and comprises receiving an image of an eye and at least one other biometric information; processing the image of the eye and the at least one other biometric information using a deep neural network to generate an embedding space representation; and processing the embedding space representation using a classifier to generate a likelihood score that the image of the eye is an image of an eye of the authorized user and the at least one other biometric information is a biometric information of the authorized user.

In a 23rd aspect, a method for iris authentication of an authorized user is disclosed. The method is performed under control of a hardware processor and comprises receiving an image of an eye; processing the image of the eye using a deep neural network to generate an embedding space representation; receiving at least one other biometric information; and processing the embedding space representation and the at least one other biometric information using a classifier to generate a likelihood score that the image of the eye is an image of an eye of the authorized user and the at least one other biometric information is a biometric information of the authorized user.

In a 24th aspect, a computer system is disclosed. The computer system comprises a hardware processor; and non-transitory memory having instructions stored thereon, which when executed by the hardware processor cause the hardware processor to perform the method of any one of aspects 1-23.

In a 25th aspect, the computer system of aspect 24, wherein the computer system is a mobile device.

In a 26th aspect, the computer system of aspect 25, wherein the mobile device is a wearable display system.

In a 27th aspect, the computer system of aspect 26, configured as a head-mounted display.

In a 28th aspect, the computer system of any one of aspects 24-27, further comprising an image sensor for capturing eye images.

In a 29th aspect, the computer system of any one of aspects 24-29, further comprising a light field display.

In a 30th aspect, a wearable display system is disclosed. The wearable display system comprises: a display; an image capture device configured to capture a first image of an eye of a user; non-transitory memory configured to store: executable instructions; and a hardware processor in communication with the display, the image capture device, and the non-transitory memory, the hardware processor programmed by the executable instructions to: receive the first image of the eye; process the first image of the eye using a deep neural network to generate an embedding space representation; and process the embedding space representation using a classifier to calculate a likelihood score that the first image of the eye is an image of an eye of an authorized user.

In a 31st aspect, the wearable display system of aspect 30, wherein the deep neural network (or a part of the deep neural network) is stored in the non-transitory memory.

In a 32nd aspect, the wearable display system of any one of aspects 30-31, wherein the classifier (or a part of the classifier) is stored in the non-transitory memory.

In a 33rd aspect, the wearable display system of any one of aspects 30-32, wherein the deep neural network comprises a plurality of layers, and wherein the plurality of layers comprises a pooling layer, a brightness normalization layer, a convolutional layer, an inception-like layer, a rectified linear layer, a softsign layer, or any combination thereof.

In a 34th aspect, the wearable display system of aspect 33, wherein the brightness normalization layer comprises a local contrast normalization layer, a local response normalization layer, or a combination thereof.

In a 35th aspect, the wearable display system of any one of aspects 30-34, wherein the deep neural network comprises a triplet network.

In a 36th aspect, the wearable display system of aspect 35, wherein the triplet network is configured to learn the deep neural network from eye images of a plurality of persons, and wherein a distance in the embedding space representation for eye images from the same person is smaller than a distance in the embedding space representation for eye images from different persons.

In a 37th aspect, the wearable display system of any one of aspects 30-36, wherein the hardware processor is programmed by the executable instructions to: grant or deny the user access to the wearable display system based on the likelihood score.

In a 38th aspect, the wearable display system of any one of aspects 30-37, wherein the embedding space representation has unit length.

In a 39th aspect, the wearable display system of any one of aspects 30-38, wherein the classifier generates the likelihood score based on the Euclidian distance.

In a 40th aspect, the wearable display system of any one of aspects 30-39, wherein the classifier is a binary classifier, a logistic regression classifier, a support vector machine classifier, a Bayesian classifier, a softmax classifier, or any combination thereof.

In a 41st aspect, the wearable display system of any one of aspects 30-40, wherein the hardware processor is programmed by the executable instructions to: segment the first image of the eye to generate a second image of an iris of the eye, and wherein to process the first image of the eye, the hardware processor is programmed by the executable instructions to: process the second image of the iris of the eye using the deep neural network to generate the embedding space representation.

In a 42nd aspect, the wearable display system of any one of aspects 30-41, wherein the first image of the eye comprises mostly of the iris and the retina of the eye.

In a 43rd aspect, the wearable display system of any one of aspects 30-42, wherein the first image of the eye comprises mostly of the retina of the eye.

In a 44th aspect, the wearable display system of any one of aspects 30-43, wherein the embedding space representation is an n-dimensional vector, and wherein the majority of the elements of the embedding space representation are statistically independent.

In a 45th aspect, a system for training an embedding network for iris authentication, comprising: computer-readable memory storing executable instructions; and one or more hardware-based processors programmed by the executable instructions to at least: access a deep neural network comprising a plurality of layers, wherein each layer of the plurality of layers is connected to at least another layer of the plurality of layers; provide the deep neural network with a training set comprising eye images of a plurality of persons; and compute embedding space representations of the plurality of eye images using the deep neural network, wherein the embedding space representations of the plurality of eye images of the same person are within a threshold.

In a 46th aspect, the system of aspect 45, wherein the instructions to compute the embedding space representations of the plurality of eye images using the deep neural network comprise: instructions to update the deep neural network based on the distances between the embedding space representations of eye images of the same persons and different persons.

In a 47th aspect, the system of any one of aspects 45-46, wherein the plurality of layers comprises a pooling layer, a brightness normalization layer, a convolutional layer, an inception-like layer, a rectified linear layer, a softsign layer, or any combination thereof.

In a 48th aspect, the system of any one of aspects 45-47, wherein the deep neural network comprises a triplet network.

In a 49th aspect, the system of aspect 48, wherein the triplet network learns the deep neural network from the training set using triplets of eye images, where two eye images of the triplet are from the same person and the third eye image of the triplet is from a different person.

In a 50th aspect, a head mounted display system is disclosed. The head mounted display system comprises: a display; an image capture device configured to capture a first image of an eye of a user; non-transitory memory configured to store: executable instructions; and a hardware processor in communication with the display, the image capture device, and the non-transitory memory, the hardware processor programmed by the executable instructions to: receive the first image of the eye; process the first image of the eye to generate a representation of the first image of the eye in polar coordinates; process the representation of the first image of the eye in polar coordinates using a deep neural network to generate an embedding space representation; and process the embedding space representation using a classifier to generate a likelihood score that the image of the eye is an image of the authorized user's eye.

In a 51st aspect, the head mounted display system of aspect 50, wherein the deep neural network (or a part of the deep neural network) is stored in the non-transitory memory.

In a 52nd aspect, the head mounted display system of any one of aspects 50-51, wherein the classifier (or a part of the classifier) is stored in the non-transitory memory.

In a 53rd aspect, the head mounted display system of any one of aspects 50-52, wherein the deep neural network comprises a plurality of layers, and wherein the plurality of layers comprises a pooling layer, a brightness normalization layer, a convolutional layer, an inception-like layer, a rectified linear layer, a softsign layer, or any combination thereof.

In a 54th aspect, the head mounted display system of aspect 53, wherein the brightness normalization layer comprises a local contrast normalization layer, a local response normalization layer, or a combination thereof.

In a 55th aspect, the head mounted display system of any one of aspects 52-54, wherein the deep neural network comprises a triplet network.

In a 56th aspect, the head mounted display system of aspect 55, wherein the triplet network is configured to learn the deep neural network from eye images of a plurality of persons, and wherein a distance in the embedding space representation for eye images from the same person is smaller than a distance in the embedding space representation for eye images from different persons.

In a 57th aspect, the head mounted display system of any one of aspects 52-56, wherein the hardware processor is programmed by the executable instructions to: grant or deny the user access to the head mounted display system based on the likelihood score.

In a 58th aspect, the head mounted display system of any one of aspects 52-57, wherein the embedding space representation has unit length.

In a 59th aspect, the head mounted display system of any one of aspects 52-58, wherein the classifier generates the likelihood score based on the Euclidian distance.

In a 60th aspect, the head mounted display system of any one of aspects 52-59, wherein the classifier is a binary classifier, a logistic regression classifier, a support vector machine classifier, a Bayesian classifier, a softmax classifier, or any combination thereof.

In a 61st aspect, the head mounted display system of any one of aspects 52-60, wherein the hardware processor is programmed by the executable instructions to: segment the first image of the eye to generate a second image of an iris of the eye, and wherein to process the first image of the eye, the hardware processor is programmed by the executable instructions to: process the second image of the iris of the eye using the deep neural network to generate the embedding space representation.

In a 62nd aspect, the head mounted display system of any one of aspects 52-61, wherein the first image of the eye comprises mostly of the iris and the retina of the eye.

In a 63rd aspect, the head mounted display system of any one of aspects 52-62, wherein the first image of the eye comprises mostly of the retina of the eye.

In a 64th aspect, the head mounted display system of any one of aspects 52-63, wherein the embedding space representation is an n-dimensional vector, and wherein the majority of the elements of the embedding space representation are statistically independent.

In a 65th aspect, a wearable display system is disclosed. The wearable display system comprises: a display; an image capture device configured to capture a first image of a first eye of a user and a second image of a second eye of the user; non-transitory memory configured to store: executable instructions; and a hardware processor in communication with the display, the image capture device, and the non-transitory memory, the hardware processor programmed by the executable instructions to: receive the first image of a first eye and the second image of a second eye; process the first image of the first eye and the second image of the second eye using a deep neural network to generate a first embedding space representation of the first eye and a second embedding space representation of the second eye; and process the first embedding space representation and the second embedding space representation using a classifier to generate a likelihood score that the first image of the first eye is an image of the authorized user's left eye and the second image of the second eye is an image of the authorized user's right eye.

In a 66th aspect, the wearable display system of aspect 65, wherein the deep neural network (or a part of the deep neural network) is stored in the non-transitory memory.

In a 67th aspect, the wearable display system of any one of aspects 65-66, wherein the classifier (or a part of the classifier) is stored in the non-transitory memory.

In a 68th aspect, the wearable display system of any one of aspects 65-67, wherein the deep neural network comprises a plurality of layers, and wherein the plurality of layers comprises a pooling layer, a brightness normalization layer, a convolutional layer, an inception-like layer, a rectified linear layer, a softsign layer, or any combination thereof.

In a 69th aspect, the wearable display system of aspect 68, wherein the brightness normalization layer comprises a local contrast normalization layer, a local response normalization layer, or a combination thereof.

In a 70th aspect, the wearable display system of any one of aspects 65-69, wherein the deep neural network comprises a triplet network.

In a 71st aspect, the wearable display system of aspect 70, wherein the triplet network is configured to learn the deep neural network from eye images of a plurality of persons, and wherein a distance in the embedding space representation for eye images from the same person is smaller than a distance in the embedding space representation for eye images from different persons.

In a 72nd aspect, the wearable display system of any one of aspects 65-71, wherein the hardware processor is programmed by the executable instructions to: grant or deny the user access to the wearable display system based on the likelihood score.

In a 73rd aspect, the wearable display system of any one of aspects 65-72, wherein the embedding space representation has unit length.

In a 74th aspect, the wearable display system of any one of aspects 65-73, wherein the classifier generates the likelihood score based on the Euclidian distance.

In a 75th aspect, the wearable display system of any one of aspects 65-74, wherein the classifier is a binary classifier, a logistic regression classifier, a support vector machine classifier, a Bayesian classifier, a softmax classifier, or any combination thereof.

In a 76th aspect, the wearable display system of any one of aspects 65-75, wherein the hardware processor is programmed by the executable instructions to: segment the first image of the eye to generate a third image of an iris of the eye; and segment the second image of the eye to generate a fourth image of an iris of the eye, and wherein to process the first image of the first eye and the second image of the second eye, the hardware processor is programmed by the executable instructions to: process the third image of the first eye and the fourth image of the second eye using the deep neural network to generate a first embedding space representation of the first eye and a second embedding space representation of the second eye.

In a 77th aspect, the wearable display system of any one of aspects 65-76, wherein the first image of the eye comprises mostly of the iris and the retina of the eye.

In a 78th aspect, the wearable display system of any one of aspects 65-77, wherein the first image of the eye comprises mostly of the retina of the eye.

In a 79th aspect, the wearable display system of any one of aspects 65-78, wherein the embedding space representation is an n-dimensional vector, and wherein the majority of the elements of the embedding space representation are statistically independent.

In a 80th aspect, a wearable display system is disclosed. The wearable display system comprises: a display; an image capture device configured to capture a first image of an eye; a biometric information capture device configured to capture at least one other biometric information; non-transitory memory configured to store: executable instructions; and a hardware processor in communication with the display, the biometric information capture device, the image capture device, and the non-transitory memory, the hardware processor programmed by the executable instructions to: receive the first image of an eye and the at least one other biometric information; process the image of the eye and the at least one other biometric information using a deep neural network to generate an embedding space representation; and process the embedding space representation using a classifier to generate a likelihood score that the image of the eye is an image of an eye of the authorized user and the at least one other biometric information is a biometric information of the authorized user.

In a 81st aspect, the wearable display system of aspect 80, wherein the deep neural network (or a part of the deep neural network) is stored in the non-transitory memory.

In a 82nd aspect, the wearable display system of any one of aspects 80-81 the classifier (or a part of the classifier) is stored in the non-transitory memory.

In a 83rd aspect, the wearable display system of any one of aspects 80-82, wherein the deep neural network comprises a plurality of layers, and wherein the plurality of layers comprises a pooling layer, a brightness normalization layer, a convolutional layer, an inception-like layer, a rectified linear layer, a softsign layer, or any combination thereof.

In a 84th aspect, the wearable display system of aspect 83, wherein the brightness normalization layer comprises a local contrast normalization layer, a local response normalization layer, or a combination thereof.

In a 85th aspect, the wearable display system of any one of aspects 80-84, wherein the deep neural network comprises a triplet network.

In a 86th aspect, the wearable display system of aspect 85, wherein the triplet network is configured to learn the deep neural network from eye images of a plurality of persons and the at least one other biometric information of the plurality of persons, and wherein a distance in the embedding space representation for eye images and the at least one other biometric information from the same person is smaller than a distance in the embedding space representation for eye images and the at least one other biometric information from different persons.

In a 87th aspect, the wearable display system of any one of aspects 80-86, wherein the hardware processor is programmed by the executable instructions to: grant or deny the user access to the wearable display system based on the likelihood score.

In a 88th aspect, the wearable display system of any one of aspects 80-87, wherein the embedding space representation has unit length.

In a 89th aspect, the wearable display system of any one of aspects 80-88, wherein the classifier generates the likelihood score based on the Euclidian distance.

In a 90th aspect, the wearable display system of any one of aspects 80-89, wherein the classifier is a binary classifier, a logistic regression classifier, a support vector machine classifier, a Bayesian classifier, a softmax classifier, or any combination thereof.

In a 91st aspect, the wearable display system of any one of aspects 80-90, wherein the hardware processor is programmed by the executable instructions to: segment the first image of the eye to generate a second image of an iris of the eye, and wherein to process the first image of the eye, the hardware processor is programmed by the executable instructions to: process the second image of the iris of the eye using the deep neural network to generate the embedding space representation.

In a 92nd aspect, the wearable display system of any one of aspects 80-91, wherein the first image of the eye comprises mostly of the iris and the retina of the eye.

In a 93rd aspect, the wearable display system of any one of aspects 80-92, wherein the first image of the eye comprises mostly of the retina of the eye.

In a 94th aspect, the wearable display system of any one of aspects 80-93, wherein the embedding space representation is an n-dimensional vector, and wherein the majority of the elements of the embedding space representation are statistically independent.

In a 95th aspect, a wearable display system is disclosed. The wearable display system comprises: a display; an image capture device configured to capture a first image of an eye; a biometric information capture device configured to capture at least one other biometric information; non-transitory memory configured to store: executable instructions; and a hardware processor in communication with the display, the biometric information capture device, the image capture device, and the non-transitory memory, the hardware processor programmed by the executable instructions to: receive the first image of the eye; process the first image of the eye using a first deep neural network to generate a first embedding space representation; receive at least one other biometric information; and process the first embedding space representation and the at least one other biometric information using a classifier to generate a likelihood score that the image of the eye is an image of an eye of the authorized user and the at least one other biometric information is a biometric information of the authorized user.

In a 96th aspect, the wearable display system of aspect 95, wherein the first deep neural network (or a part of the deep neural network) is stored in the non-transitory memory.

In a 97th aspect, the wearable display system of any one of aspects 95-96, wherein the classifier (or a part of the classifier) is stored in the non-transitory memory.

In a 98th aspect, the wearable display system of any one of aspects 95-97, wherein the hardware processor is further programmed by the executable instructions to: process the at least one other biometric information using the second deep neural network to generate a second embedding space representation, and wherein the instructions to process the first embedding space representation and the at least one other biometric information using the classifier to generate a likelihood score that the image of the eye is an image of an eye of the authorized user and the at least one other biometric information is a biometric information of the authorized user comprises instructions to: process the first embedding space representation and the second embedding space representation using the classifier to generate a likelihood score that the image of the eye is an image of an eye of the authorized user and the at least one other biometric information is a biometric information of the authorized user.

In a 99th aspect, the wearable display system of any one of aspects 95-98, wherein the deep neural network comprises a plurality of layers, and wherein the plurality of layers comprises a pooling layer, a brightness normalization layer, a convolutional layer, an inception-like layer, a rectified linear layer, a softsign layer, or any combination thereof.

In a 100th aspect, the wearable display system of aspect 99, wherein the brightness normalization layer comprises a local contrast normalization layer, a local response normalization layer, or a combination thereof.

In a 101st aspect, the wearable display system of any one of aspects 95-100, wherein the deep neural network comprises a triplet network.

In a 102nd aspect, the wearable display system of aspect 101, wherein the triplet network is configured to learn the deep neural network from eye images of a plurality of persons and the at least one other biometric information of the plurality of persons, and wherein a distance in the embedding space representation for eye images and the at least one other biometric information from the same person is smaller than a distance in the embedding space representation for eye images and the at least one other biometric information from different persons.

In a 103rd aspect, the wearable display system of any one of aspects 95-102, wherein the hardware processor is programmed by the executable instructions to: grant or deny the user access to the wearable display system based on the likelihood score.

In a 104th aspect, the wearable display system of any one of aspects 95-103, wherein the first embedding space representation has unit length.

In a 105th aspect, the wearable display system of any one of aspects 95-104, wherein the classifier generates the likelihood score based on the Euclidian distance.

In a 106th aspect, the wearable display system of any one of aspects 95-105, wherein the classifier is a binary classifier, a logistic regression classifier, a support vector machine classifier, a Bayesian classifier, a softmax classifier, or any combination thereof.

In a 107th aspect, the wearable display system of any one of aspects 95-106, wherein the hardware processor is programmed by the executable instructions to: segment the first image of the eye to generate a second image of an iris of the eye, and wherein to process the first image of the eye, the hardware processor is programmed by the executable instructions to: process the second image of the iris of the eye using the deep neural network to generate the embedding space representation.

In a 108th aspect, the wearable display system of any one of aspects 95-107, wherein the first image of the eye comprises mostly of the iris and the retina of the eye.

In a 109th aspect, the wearable display system of any one of aspects 95-108, wherein the first image of the eye comprises mostly of the retina of the eye.

In a 110th aspect, the wearable display system of any one of aspects 95-109, wherein the embedding space representation is an n-dimensional vector, and wherein the majority of the elements of the embedding space representation are statistically independent.

In a 111th aspect, a wearable display system is disclosed. The wearable display system comprises: a display; an image capture device configured to capture a plurality of first images of a first eye of a user; non-transitory memory configured to store: and executable instructions; and a hardware processor in communication with the display, the image capture device, and the non-transitory memory, the hardware processor programmed by the executable instructions to: receive the plurality of first images of the first eye; process the plurality of first images of the first eye using a deep neural network to generate a first embedding space representation; and process the first embedding space representation using a first classifier to calculate a first likelihood score that the plurality of first images of the first eye comprises an image of a first eye of an authorized user.

In a 112th aspect, the wearable display system of aspect 111, wherein the deep neural network (or a part of the deep neural network) is stored in the non-transitory memory.

In a 113rd aspect, the wearable display system of any one of aspects 111-112, the first classifier (or a part of the classifier) is stored in the non-transitory memory.

In a 114th aspect, the wearable display system of any one of aspects 111-113, wherein the deep neural network comprises a plurality of layers, and wherein the plurality of layers comprises a pooling layer, a brightness normalization layer, a convolutional layer, an inception-like layer, a rectified linear layer, a softsign layer, or any combination thereof.

In a 115th aspect, the wearable display system of aspect 114, wherein the brightness normalization layer comprises a local contrast normalization layer, a local response normalization layer, or a combination thereof.

In a 116th aspect, the wearable display system of any one of aspects 111-115, wherein the deep neural network comprises a triplet network.

In a 117th aspect, the wearable display system of aspect 116, wherein the triplet network is configured to learn the deep neural network from a plurality of eye images of each of a plurality of persons, and wherein a distance in the first embedding space representation for eye images of an eye of a person is smaller than a distance in the first embedding space representation for eye images from different persons or eye images from different eyes of a person.

In a 118th aspect, the wearable display system of any one of aspects 111-117, wherein the hardware processor is programmed by the executable instructions to: grant or deny the user access to the wearable display system based on the first likelihood score.

In a 119th aspect, the wearable display system of any one of aspects 111-118, wherein the first embedding space representation has unit length.

In a 120th aspect, the wearable display system of any one of aspects 111-119, wherein the classifier generates the first likelihood score based on the Euclidian distance.

In a 121st aspect, the wearable display system of any one of aspects 111-120, wherein the classifier is a binary classifier, a logistic regression classifier, a support vector machine classifier, a Bayesian classifier, a softmax classifier, or any combination thereof.

In a 122nd aspect, the wearable display system of any one of aspects 111-121, wherein the hardware processor is programmed by the executable instructions to: segment the plurality of first images of the first eye to generate a plurality of second images of an iris of the first eye, and wherein to process the plurality of first images of the first eye, the hardware processor is programmed by the executable instructions to: process the plurality of second images of the iris of the eye using the deep neural network to generate the first embedding space representation.

In a 123rd aspect, the wearable display system of any one of aspects 111-122, wherein the plurality of first images of the eye each comprises mostly of the iris and the retina of the eye.

In a 124th aspect, the wearable display system of any one of aspects 111-123, wherein the plurality of first images of the eye each comprises mostly of the retina of the eye.

In a 125th aspect, the wearable display system of any one of aspects 111-124, wherein the first embedding space representation is an n-dimensional vector, and wherein the majority of the elements of the first embedding space representation are statistically independent.

In a 126th aspect, the wearable display system of any one of aspects 111-125, wherein the hardware processor is further programmed by the executable instructions to: receive a plurality of second images of the second eye of the user; process the plurality of second images of the second eye using the deep neural network to generate a second embedding space representation; and process the second embedding space representation using the first classifier to calculate a second likelihood score that the plurality of first images of the second eye comprises an image of a second eye of an authorized user.

In a 127th aspect, the wearable display system of any one of aspects 111-125, wherein the hardware processor is further programmed by the executable instructions to: receive a plurality of second images of the second eye of the user, wherein to process the plurality of first images of the first eye, the hardware processor is programmed by the executable instructions to: process the plurality of first images of the first eye and the plurality of second images of the second eye using the deep neural network to generate the first embedding space representation, and wherein to process the first embedding space representation, the hardware processor is programmed by the executable instructions to: process the first embedding space representation using the first classifier to calculate a first likelihood score that the plurality of first images of the first eye comprises an image of a first eye of an authorized user and the plurality of second images of the second eye comprises an image of a second eye of the authorized user.

In a 128th aspect, the wearable display system of any one of aspects 111-125, wherein the hardware processor is further programmed by the executable instructions to: receive at least one other biometric information of the user; process the at least one other biometric information using a second neural network to generate a second embedding space representation; and process the second embedding space representation using a second classifier to calculate a second likelihood score that the at least one other biometric information comprises a biometric information of the authorized user.

In a 129th aspect, the wearable display system of any one of aspects 111-125, wherein the hardware processor is further programmed by the executable instructions to: receive at least one other biometric information of the user, wherein to process the plurality of first images of the first eye, the hardware processor is programmed by the executable instructions to: process the plurality of first images of the first eye and the at least one other biometric information using the deep neural network to generate the first embedding space representation, and wherein to process the first embedding space representation, the hardware processor is programmed by the executable instructions to: process the first embedding space representation using the first classifier to calculate a first likelihood score that the plurality of first images of the first eye comprises an image of a first eye of an authorized user and the at least one other type of biometric information comprises a biometric information of the authorized user.

In a 130th aspect, a system for training an embedding network for iris authentication is disclosed. The system comprises: computer-readable memory storing executable instructions; and one or more hardware-based hardware processors programmed by the executable instructions to at least: access a deep neural network comprising a plurality of layers, wherein each layer of the plurality of layers is connected to at least another layer of the plurality of layers; provide the deep neural network with a training set, wherein each element of the training set comprises a plurality of eye images of a person, and wherein elements of the training set comprise pluralities of eye images of different persons; and compute embedding space representations of the elements of the training set using the deep neural network, wherein the embedding space representations of elements of the same person are within a first threshold, wherein the embedding space representations of elements of different persons are greater than a second threshold, and wherein the first threshold is smaller than the second threshold.

In a 131st aspect, the system of aspect 130, wherein the instructions to compute the embedding space representations of the elements of the training set using the deep neural network comprise: instructions to update the deep neural network based on the distances between the embedding space representations of elements of the same persons and different persons.

In a 132nd aspect, the system of aspect 131, wherein the plurality of layers comprises a pooling layer, a brightness normalization layer, a convolutional layer, an inception-like layer, a rectified linear layer, a softsign layer, or any combination thereof.

In a 133rd aspect, the system of any one of aspects 130-132, wherein the deep neural network comprises a triplet network.

In a 134th aspect, the system of aspect 133, wherein the triplet network learns the embedding from the training set using triplets of elements of the training set, where two elements of the triplet comprise eye images from the same person and the third element of the triplet comprises eye images from a different person.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable display system comprising:
   a display;
   an image capture device configured to capture eye images of a wearer;
   a non-transitory computer readable medium having software instructions stored thereon, the software instructions executable by a hardware computer processor to perform operations comprising:
   receiving a first eye image from the image capture device;
   receiving, from an authentication training system, an embedding configured to determine embedding space representations of eye images using a deep neural network and at least one classifier usable to determine a likelihood that respective embedding space representations of images are associated with an authorized user;
   processing the first eye image to generate a representation of the first eye image in polar coordinates;
   processing the representation of the first eye image using the embedding to generate a first embedding space representation of the first eye image, wherein the first embedding space representation is an n-dimensional vector, and wherein a majority of elements of the first embedding space representation are statistically independent;

processing the first embedding space representation using the at least one classifier to calculate a likelihood score that the first eye image is associated with the authorized user; and granting or denying access to the wearable display system based on the likelihood score.

2. The system of claim 1, wherein the one or more deep neural networks comprise a plurality of layers, and wherein the plurality of layers comprises a pooling layer, a brightness normalization layer, a convolutional layer, an inception-like layer, a rectified linear layer, a softsign layer, or any combination thereof.

3. The system of claim 2, wherein the brightness normalization layer comprises a local contrast normalization layer, a local response normalization layer, or a combination thereof.

4. The system of claim 1, wherein the first embedding space representation has unit length.

5. The system of claim 1, wherein the at least one classifier determines the likelihood score based on a Euclidian distance.

6. The system of claim 1, wherein the at least one classifier is a binary classifier, a logistic regression classifier, a support vector machine classifier, a Bayesian classifier, a softmax classifier, or any combination thereof.

7. The system of claim 1, wherein the wearable display system is configured to: segment the first eye image to generate a second eye image, and wherein to process the first eye image, the wearable display system is configured to: process the second eye image using the embedding to generate the first embedding space representation.

8. The system of claim 1, wherein the deep neural network is trained using a triplet network.

9. The system of claim 8, wherein the triplet network is configured to learn the deep neural network from eye images of a plurality of persons, and wherein a distance in an embedding space representation based on eye images from the first eye of an individual person is smaller than a distance in an embedding space representation based on eye images from different persons and smaller than a distance in an embedding space representation based on eye images from the second eye of the individual person.

10. The system of claim 8, wherein the first eye image comprises mostly of the iris and the retina of the first eye.

11. The system of claim 8, wherein the first eye image comprises mostly of the retina of the first eye.

12. The system of claim 1, wherein the deep neural network is configured to learn the embedding from a set of biometric information, wherein the set of biometric information comprises at least one of skin tone, skin texture, fingerprints, or voice.

13. The system of claim 1, wherein the deep neural network is further configured to learn a co-embedding for secondary biometric information and wherein the wearable display system is further programmed to:

process biometric data using the co-embedding to generate a co-embedding space representation based on the biometric data; and process the co-embedding space representation using the at least one classifier to calculate the likelihood score that the first eye image of the eye is an image of an eye of an authorized user.

* * * * *